(12) United States Patent  
Pinkos

(10) Patent No.: US 7,384,359 B2
(45) Date of Patent: Jun. 10, 2008

(54) METHOD AND APPARATUS FOR TRANSMITTING AXLE SENSOR DATA

(75) Inventor: Andrew F. Pinkos, Clarkston, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 239 days.

(21) Appl. No.: 11/359,908

(22) Filed: Feb. 22, 2006

(65) Prior Publication Data

US 2006/0270512 A1 Nov. 30, 2006

Related U.S. Application Data

(63) Continuation-in-part of application No. 11/137,997, filed on May 26, 2005, now Pat. No. 7,211,020.

(51) Int. Cl.
*F16H 48/30* (2006.01)
*F16D 23/00* (2006.01)

(52) U.S. Cl. ................... 475/150; 192/30 W

(58) Field of Classification Search .......... 74/339; 192/30 W; 340/453; 475/150, 231
See application file for complete search history.

(56) References Cited

U.S. PATENT DOCUMENTS

| | | | |
|---|---|---|---|
| 3,732,752 A | 5/1973 | Louckes et al. | |
| 5,157,966 A | 10/1992 | Lugosi et al. | |
| 5,867,092 A | 2/1999 | Vogt | |
| 5,984,823 A | 11/1999 | Gage | |
| 5,989,147 A | 11/1999 | Forrest et al. | |
| 6,038,506 A | 3/2000 | Dickhans et al. | |
| 6,203,464 B1 | 3/2001 | Ishikawa et al. | |
| 6,309,321 B1 | 10/2001 | Valente | |
| 6,334,832 B1 | 1/2002 | Heravi et al. | |
| 6,527,664 B2 | 3/2003 | Hunt | |
| 6,640,951 B2* | 11/2003 | Bamberger et al. | 192/85 R |
| 7,152,720 B2* | 12/2006 | Claussen et al. | 192/30 W |

FOREIGN PATENT DOCUMENTS

EP 1 435 479 A2 7/2004

* cited by examiner

*Primary Examiner*—Dirk Wright
(74) *Attorney, Agent, or Firm*—Harness, Dickey & Pierce, P.L.C.

(57) ABSTRACT

An axle assembly includes a housing having first and second shafts rotatably positioned in the housing. A power transfer mechanism is also positioned in the housing and selectively operable to transmit rotary power between the first and second shafts. An actuator is operable to move a linearly moveable member of the power transfer mechanism. A sensor circuit is positioned within the housing and operable to output a signal having a frequency that varies in accordance with the position of the linearly moveable member, thereby indicating an operating state of the power transfer mechanism.

19 Claims, 29 Drawing Sheets

Table 1 - Sensor Configuration 3

| Sensor 1 State | Sensor 2 State | Zone | Sensor Iout | Alternate Sensor Iout |
|---|---|---|---|---|
| ON | ON | 1 | 3mA | 3mA |
| OFF | ON | 2 | 21mA | 3mA |
| OFF | OFF | 3 | 21mA | 21mA |
| OFF | OFF | 3' | 21mA | 21mA |
| OFF | ON | 2' | 21mA | 3mA |
| ON | ON | 1' | 3mA | 3mA |

Table 1 - Sensor Configuration 6

| Sensor 1 State | Sensor 2 State | Zone | Sensor Iout | Alternate Sensor Iout |
|---|---|---|---|---|
| ON | ON | 1 | 3.8mA | 3.8mA |
| OFF | ON | 2 | 3.8mA | 8.5mA |
| OFF | OFF | 3 | 21mA | 21mA |
| OFF | OFF | 3' | 3.8mA | 21mA |
| OFF | ON | 2' | 3.8mA | 8.5mA |
| ON | ON | 1' | 3.8mA | 3.8mA |

Table 1 - Sensor Configuration 6

| Sensor 1 State | Sensor 2 State | Zone | Sensor Iout | Alternate Sensor Iout |
|---|---|---|---|---|
| ON | ON | 1 | 3.8mA | 3.8mA |
| OFF | ON | 2 | 3.8mA | 8.5mA |
| OFF | OFF | 3 | 21mA | 21mA |
| OFF | OFF | 3' | 21mA | 21mA |
| OFF | ON | 2' | 3.8mA | 8.5mA |
| ON | ON | 1' | 3.8mA | 3.8mA |

Table 1 - Sensor Configuration 6

| Sensor 1 State | Sensor 2 State | Zone | Sensor Iout | Alternate Sensor Iout |
|---|---|---|---|---|
| ON | ON | 1 | 3.8mA | 3.8mA |
| OFF | ON | 2 | 3.8mA | 8.5mA |
| OFF | OFF | 3 | 21mA | 21mA |
| OFF | OFF | 3' | 21mA | 21mA |
| OFF | ON | 2' | 3.8mA | 8.5mA |
| ON | ON | 1' | 3.8mA | 3.8mA |

Table 1 - Sensor Configuration 6

| Sensor 1 State | Sensor 2 State | Zone | Sensor Iout | Alternate Sensor Iout |
|---|---|---|---|---|
| ON | ON | 1 | 3.8mA | 3.8mA |
| OFF | ON | 2 | 3.8mA | 8.5mA |
| OFF | OFF | 3 | 21mA | 21mA |
| OFF | OFF | 3' | 21mA | 21mA |
| OFF | ON | 2' | 3.8mA | 8.5mA |
| ON | ON | 1' | 3.8mA | 3.8mA |

METHOD AND APPARATUS FOR TRANSMITTING AXLE SENSOR DATA

CROSS-REFERENCE TO RELATED APPLICATIONS

This application is a continuation-in-part of U.S. patent application Ser. No. 11/137,997, filed on May 26, 2005 now U.S. Pat. No. 7,211,020. The disclosure of the above application is incorporated herein by reference.

BACKGROUND OF THE INVENTION

The present invention generally relates to differentials for motor vehicles and, more particularly, to a locking differential with a locking state detection system.

As is known, many motor vehicles are equipped with driveline systems including differentials which function to drivingly interconnect an input shaft and a pair of output shafts. The differential functions to transmit drive torque to the output shafts while permitting speed differentiation between the output shafts.

Conventional differentials include a pair of side gears fixed for rotation with the output shafts and two or more sets of meshed pinion gears mounted within a differential case. However, the conventional differential mechanism has a deficiency when a vehicle is operated on a slippery surface. When one wheel of the vehicle is on a surface having a low coefficient of friction, most or all of the torque will be delivered to the slipping wheel. As a result, the vehicle often becomes immobilized.

To overcome this problem, it is known to provide a mechanical differential having an additional mechanism that limits or selectively prevents differentiation of the speed between the output shafts. Typically, the mechanical device used to provide the limited-slip or non-slip function is a friction clutch. The friction clutch is a passive device which limits the differential speed between the output shafts only after a certain differential speed has been met. Additionally, such mechanical devices may not be selectively disengaged during operation of anti-lock braking systems or vehicle traction control systems. For example, four-wheel anti-lock braking systems may attempt to measure and control the rotational speed of each wheel independently. If a mechanical type limited slip differential is present, independent control of the speed of each wheel coupled to a differential is no longer possible. Accordingly, it would be desirable to provide an improved differential which may be actively controlled in conjunction with other control systems present on the vehicle. A detection system operable to determine the present state of operation of the differential may also be desirable.

SUMMARY OF THE INVENTION

The present invention relates to an axle assembly including a housing having first and second shafts rotatably positioned in the housing. A power transfer mechanism is also positioned in the housing and selectively operable to transmit rotary power between the first and second shafts. An actuator is operable to move a linearly moveable member of the power transfer mechanism. A sensor circuit is positioned within the housing and operable to output a signal having a frequency that varies in accordance with the position of the linearly moveable member, thereby indicating an operating state of the power transfer mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is directed to an improved differential with a locking state detection system for a drivetrain of a motor vehicle. The differential of the present invention includes an actuator operable to place the differential in an "open" or "locked" condition. The detection system provides a signal indicating whether the differential is in the "open" or "locked" condition. It should be appreciated that the differential of the present invention may be utilized with a wide variety of driveline components and is not intended to be specifically limited to the particular application described herein. In addition, the actuator of the differential of the present invention may be used in conjunction with many types of differentials such as those having a bevel gear design or a parallel-axis helical design which may be of an open or limited-slip variety.

Figure 1:
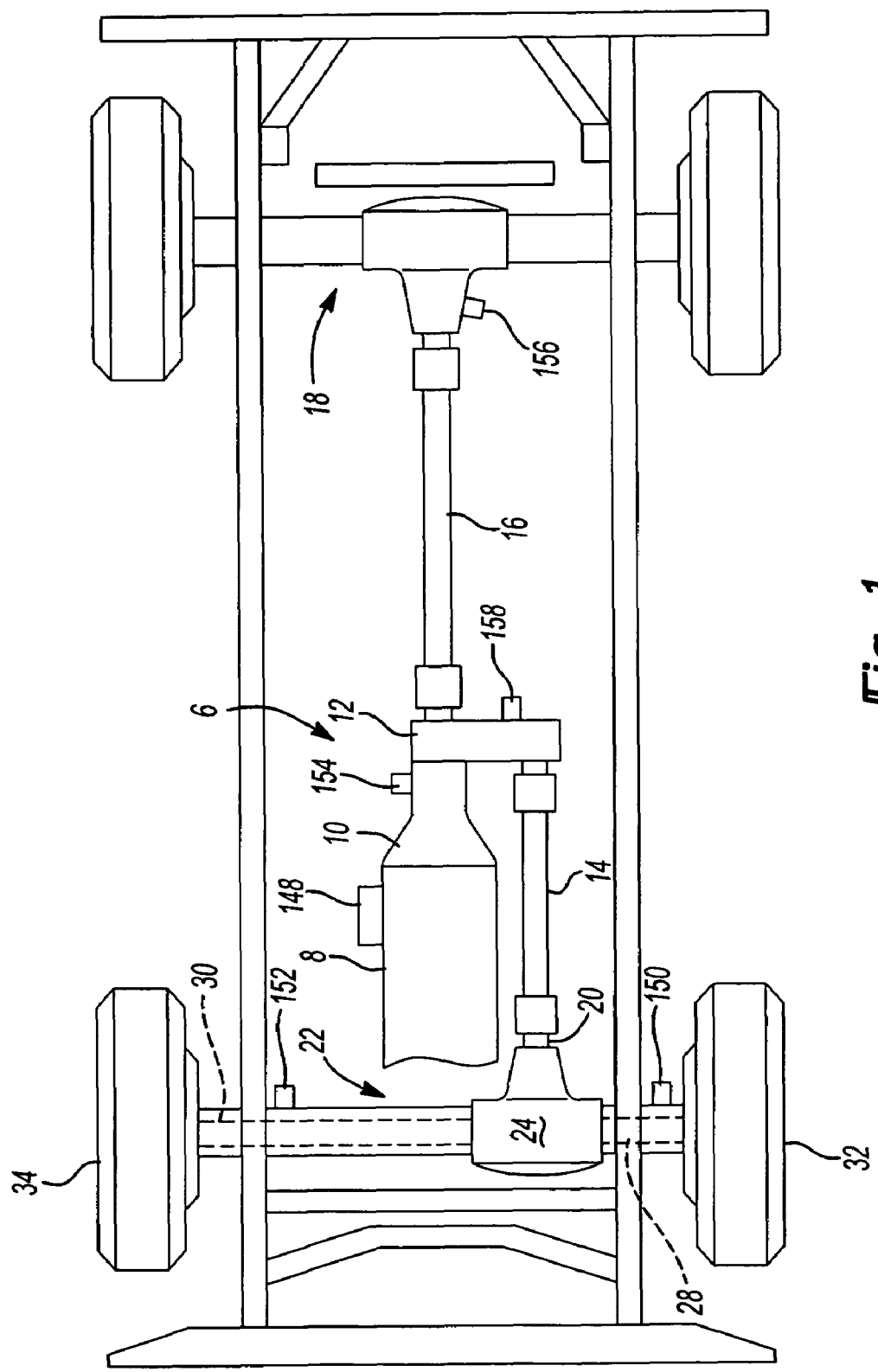
FIG. 1 is a schematic view of an exemplary motor vehicle drivetrain including a differential assembly of the present invention.
Figure 2:
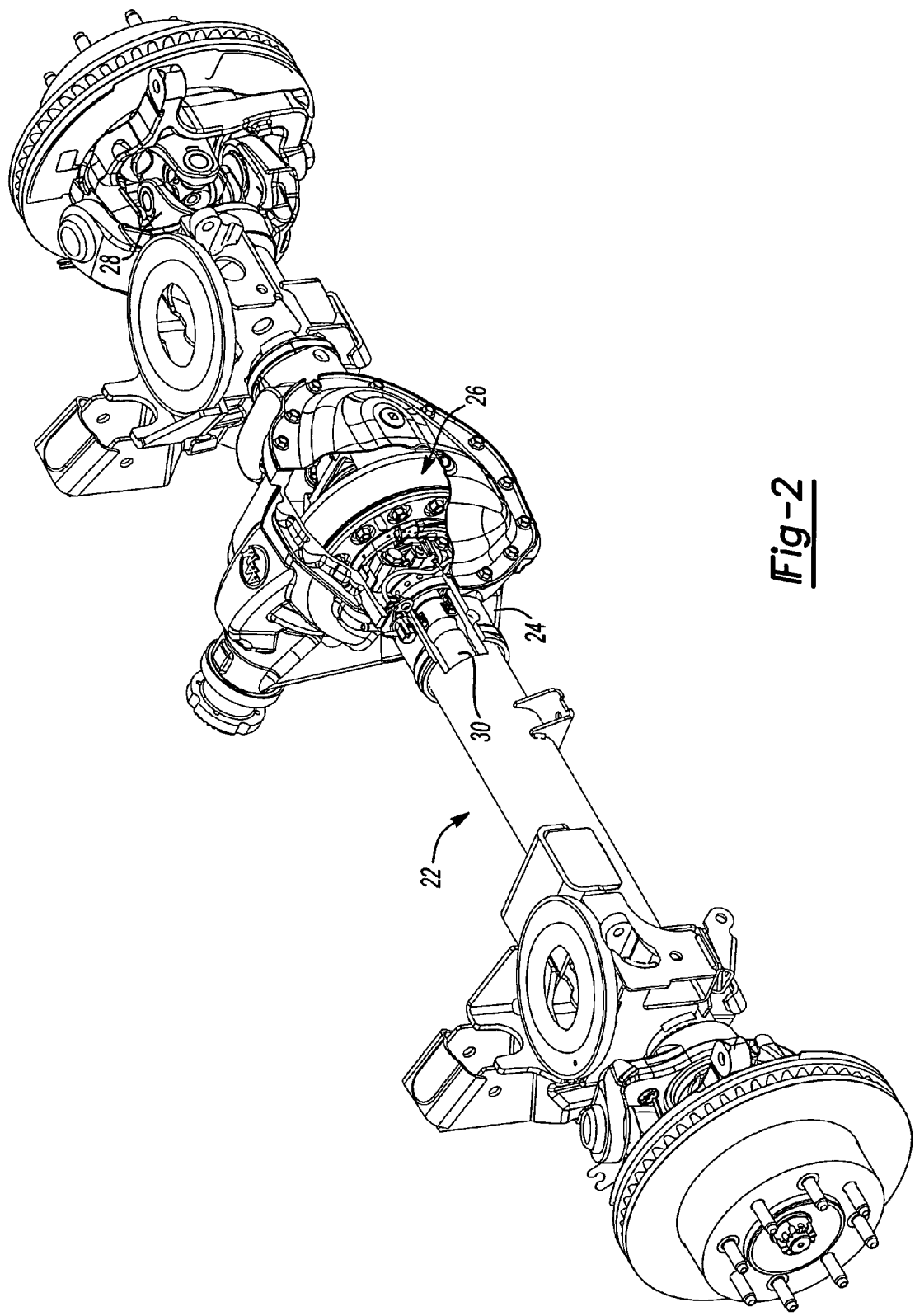
FIG. 2 is a fragmentary perspective view of a front driving axle of the present invention.
Figure 3:
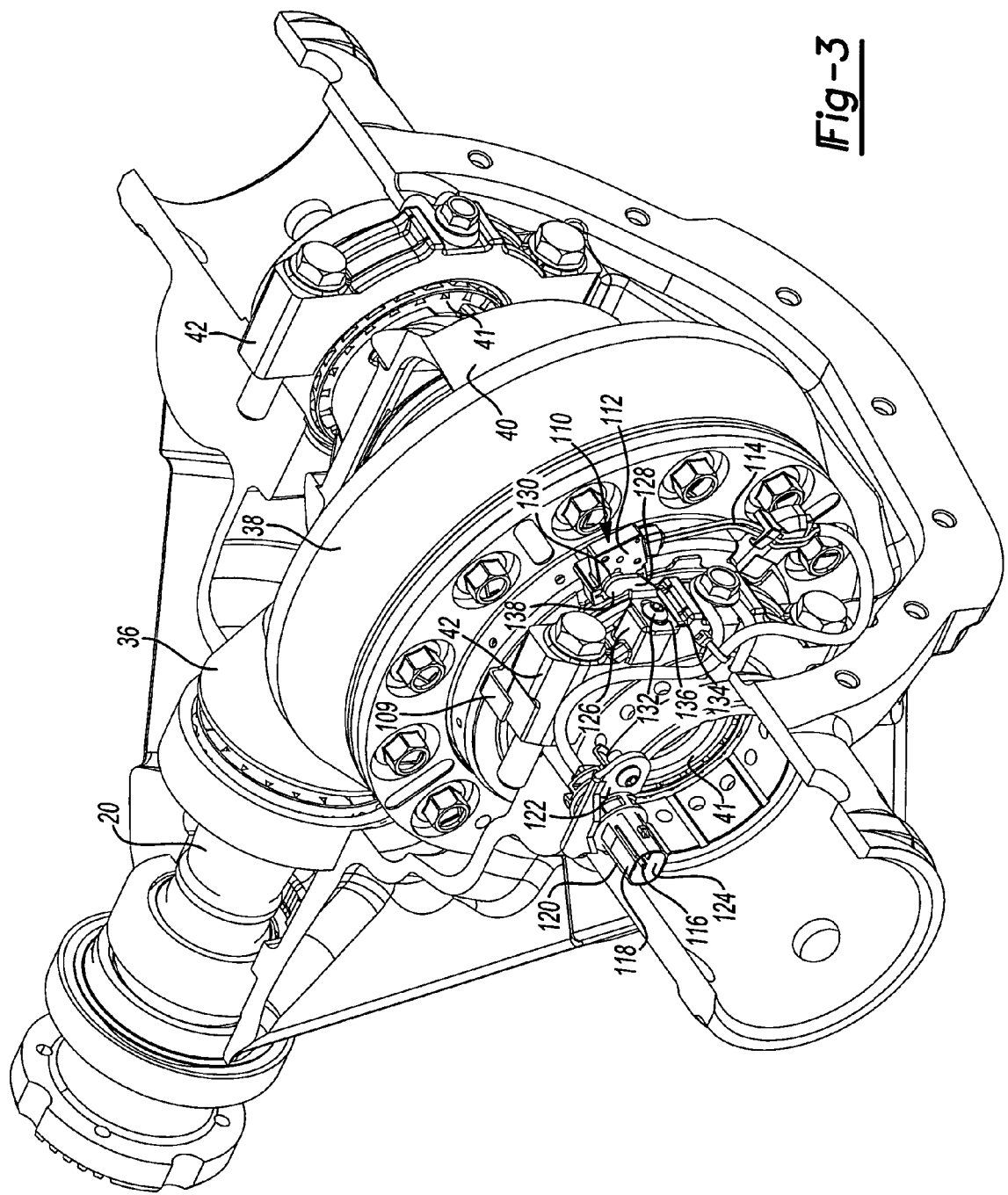
FIG. 3 is a fragmentary perspective view of the front driving axle of the present invention.

With reference to FIGS. 1-3, a drivetrain 6 for an exemplary motor vehicle is shown to include an engine 8, a transmission 10, a transfer case 12, a forward propeller shaft 14 and a rearward propeller shaft 16. Rearward propeller shaft 16 provides torque to a rear axle assembly 18. Forward propeller shaft 14 provides torque from engine 8 to a pinion shaft 20 of a front axle assembly 22. Front axle assembly 22 includes an axle housing 24, a differential assembly 26 supported in axle housing 24 and a pair of axle shafts 28 and 30 respectively interconnected to left and right front wheels 32 and 34.

Figure 4:
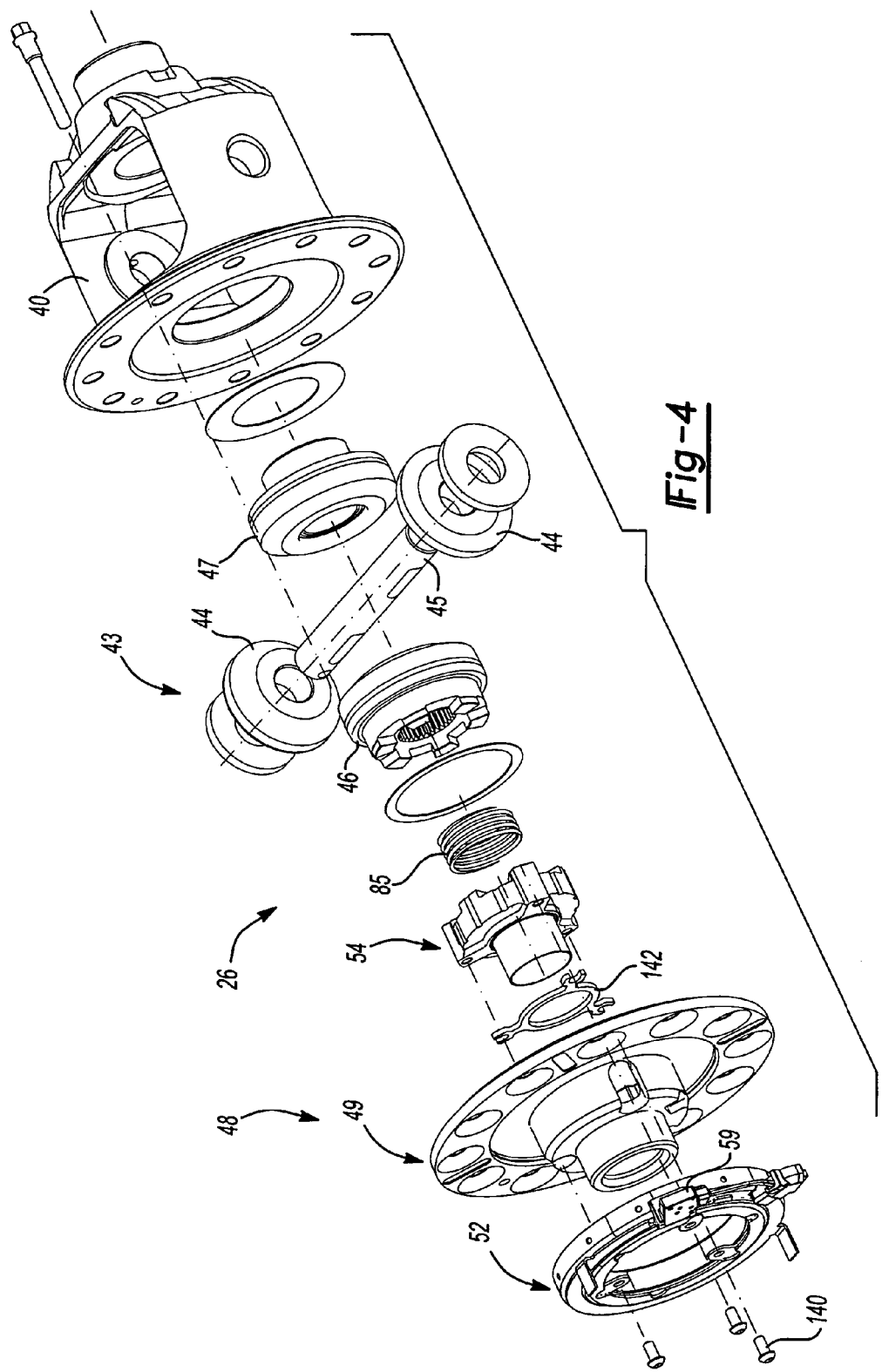
FIG. 4 is an exploded perspective view of a differential assembly of the present invention.
Figure 5:
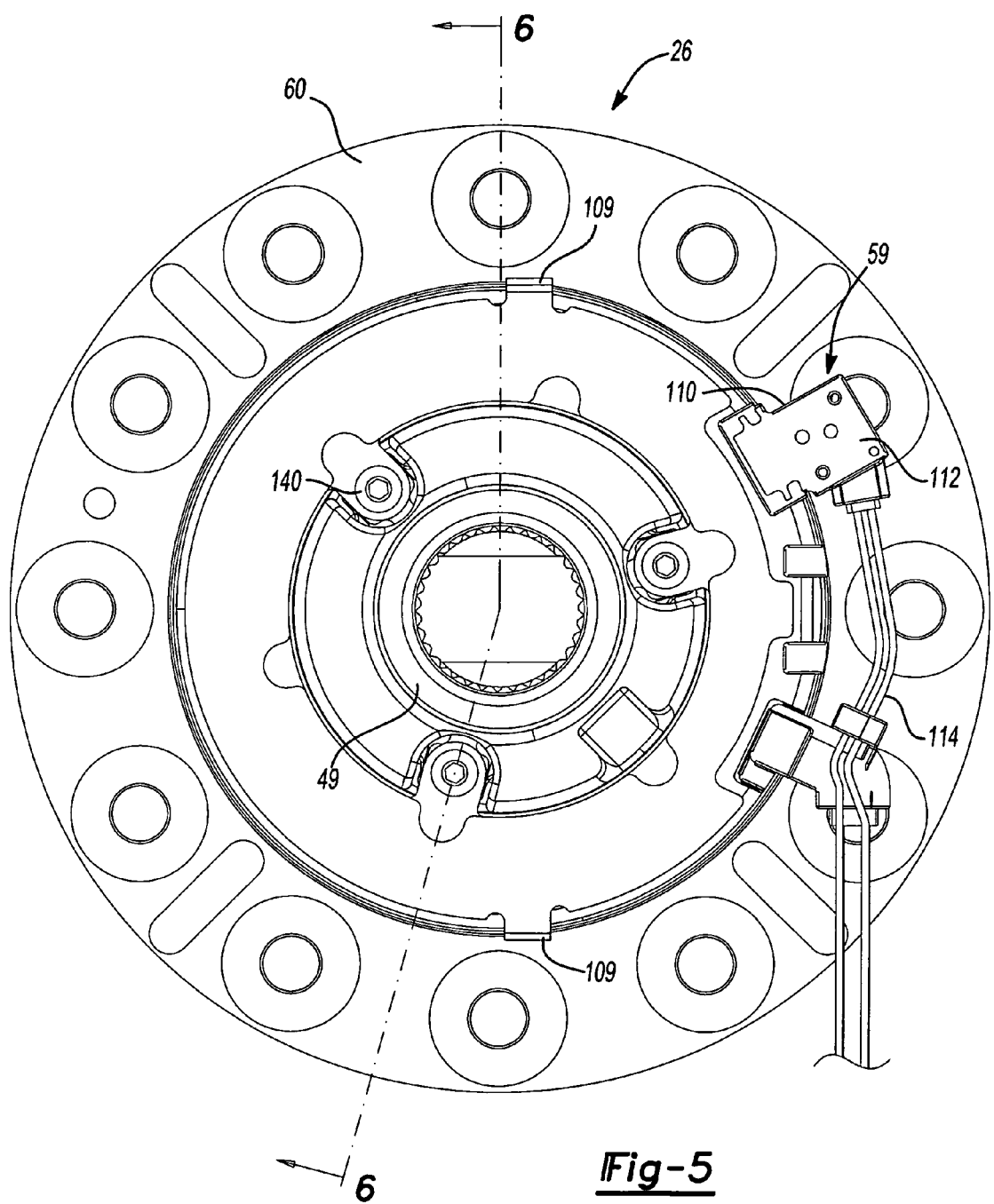
FIG. 5 is an end view of the differential assembly of the present invention.

Pinion shaft 20 has a pinion gear 36 fixed thereto which drives a ring gear 38 that is fixed to a differential case 40 of differential assembly 26. Differential case 40 is rotatably supported in axle housing 24 by a pair of laterally spaced bearings 41. Bearings 41 are retained by bearing caps 42 coupled to axle housing 24. A gearset 43 (FIG. 4) supported within differential case 40 transfers rotary power from differential case 40 to axle shafts 28 and 30, and facilitates relative rotation (i.e., differentiation) therebetween. Thus, rotary power from engine 8 is transmitted to axle shafts 28 and 30 for driving front wheels 32 and 34 via transmission 10, transfer case 12, forward propeller shaft 14, pinion shaft 20, differential case 40 and gearset 43. While differential assembly 26 is depicted in a front-wheel drive application, the present invention is contemplated for use in differential assemblies installed in trailing axles, rear axles, transfer cases for use in four-wheel drive vehicles and/or any other known vehicular driveline application.

FIGS. 4-8 depict differential assembly 26 to include differential case 40 and gearset 43. Gearset 43 includes a pair of pinion gears 44 rotatably supported on a cross shaft 45. First and second side gears 46 and 47 are drivingly interconnected to pinion gears 44 and axle shafts 28 and 30. Differential assembly 26 also includes an actuator and sensor assembly 48 operable to selectively couple first side gear 46 to differential case 40, thereby placing differential assembly 26 in a fully locked condition.

A cap 49 is coupled to differential case 40 to define a pocket 50 for receipt of actuator and sensor assembly 48. Actuator and sensor assembly 48 includes a solenoid assembly 52, an actuating ring 54, a draw plate 56, a retainer 58 and a sensor assembly 59. Cap 49 includes a flange 60 coupled to a flange 62 of case 40. Flange 60 of cap 49 includes a recess 64 sized to receive a portion of solenoid assembly 52 during actuation. Cap 49 includes a pair of stepped bores 66 and 68 which define pocket 50. Specifically, first bore 66 includes an annular surface 70 while second bore 68 includes an annular surface 72. First bore 66 includes an end face 74 radially inwardly extending from annular surface 70. An aperture 76 extends through the cap 49 and is in communication with second bore 68 where aperture 76 and second bore 68 are sized to receive a portion of the axle shaft.

Figure 6:
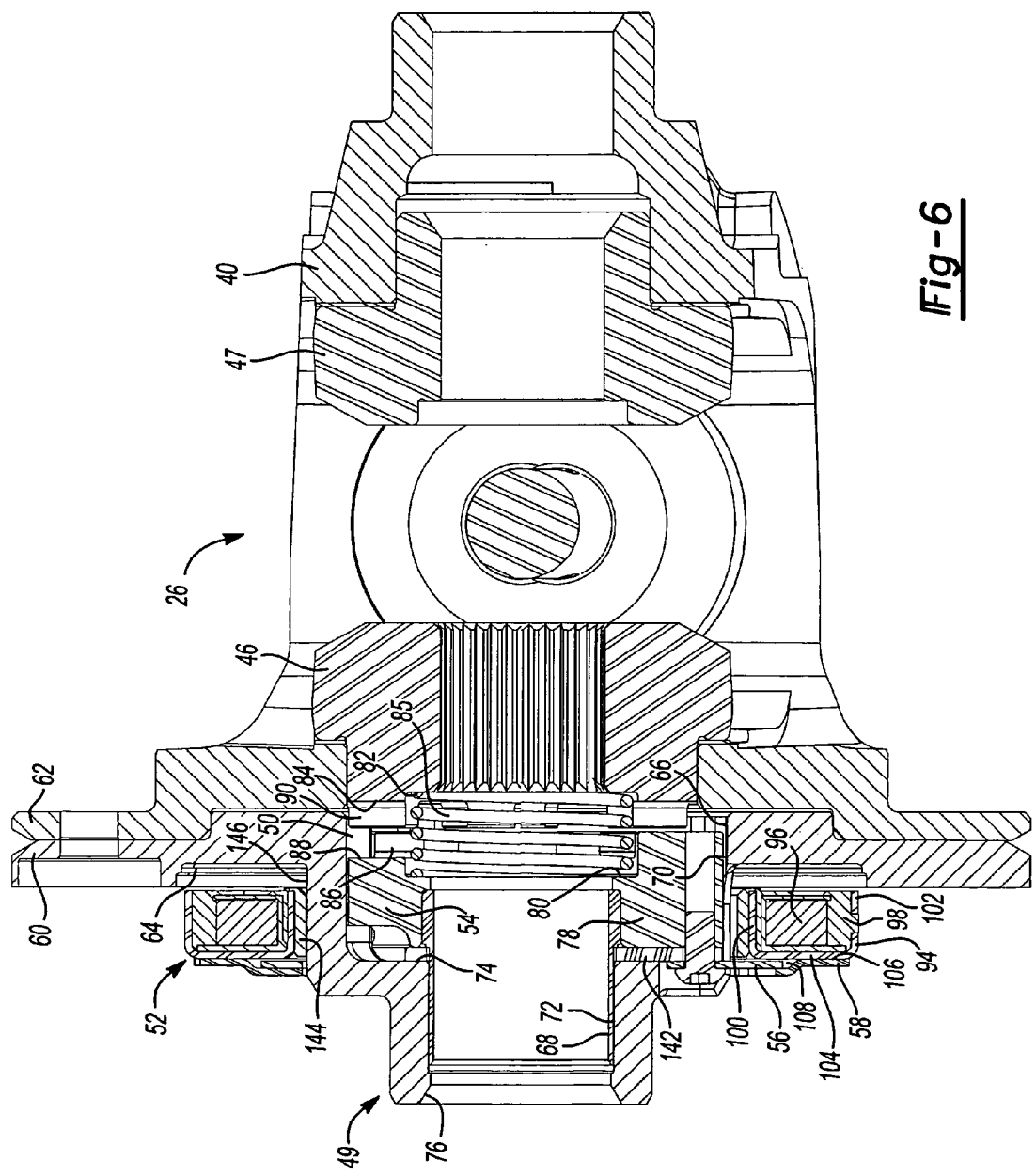
FIG. 6 is a cross-sectional side view of the differential assembly of the present invention taken along line 6-6 in FIG. 5.
Figure 7:
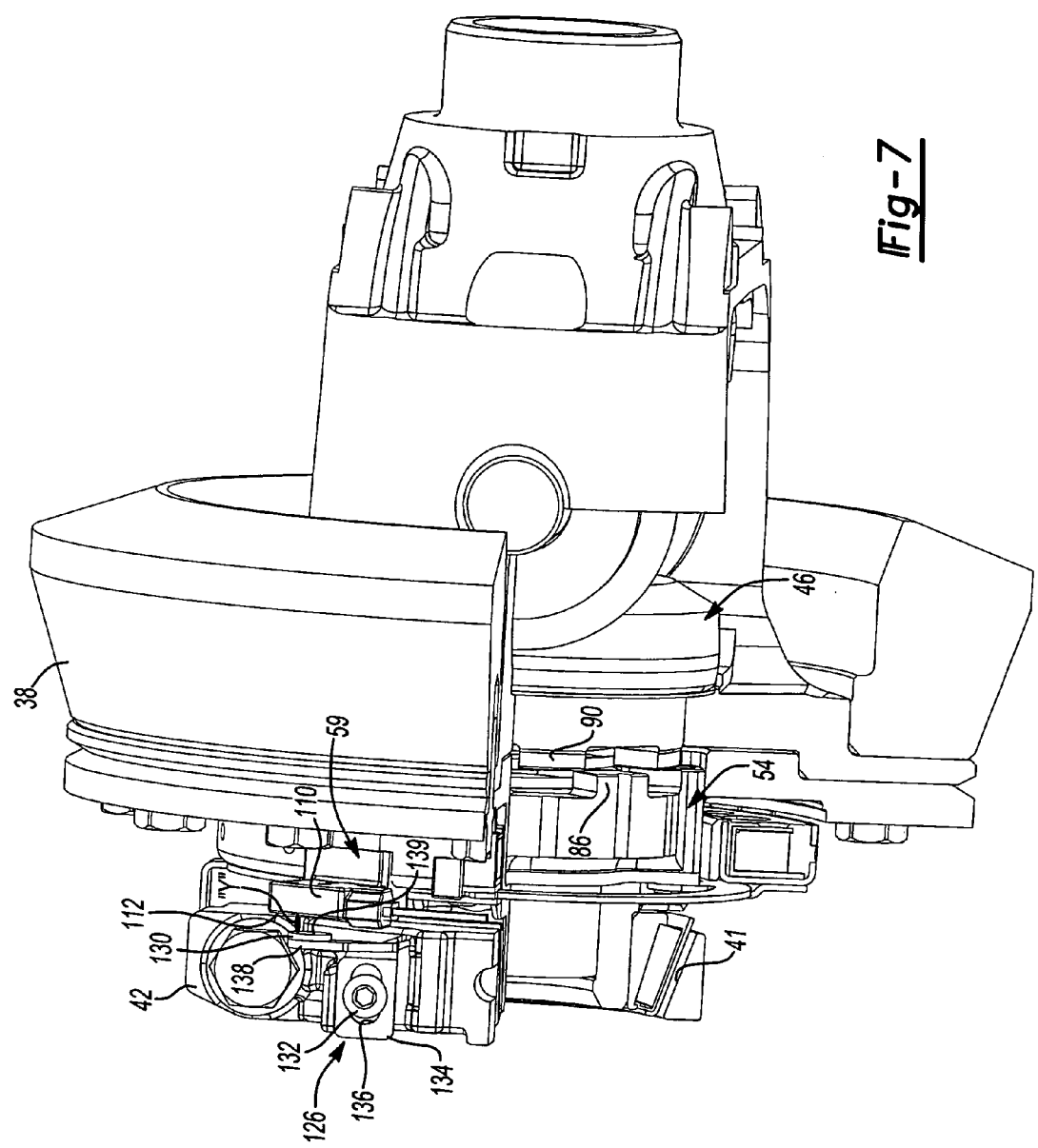
FIG. 7 is a fragmentary side view of the differential assembly of the present invention showing the actuating ring in a position disengaged from the side gear.

Actuating ring 54 includes a generally hollow cylindrical body 78 having an annular recess 80 formed at one end. Side gear 46 includes a similarly sized annular recess 82 formed on an outboard face 84. A compression spring 85 is positioned between actuating ring 54 and side gear 46 within annular recesses 80 and 82. A plurality of axially extending dogs 86 protrude from an end face 88 of actuating ring 54. A corresponding plurality of dogs 90 axially extend from outboard face 84 of side gear 46. Actuating ring 54 is moveable from a disengaged position as shown in FIGS. 6 and 7 to an engaged position shown in FIG. 8. In the disengaged position, dogs 86 of actuating ring 54 are released from engagement with dogs 90 of side gear 46. In contrast, when actuating ring 54 is moved to its engaged position, dogs 86 engage dogs 90 to rotatably fix side gear 46 to differential case 40.

Solenoid assembly 52 includes a metallic cup 94 and a wire coil 96. Wire coil 96 is positioned within cup 94 and secured thereto by an epoxy 98. Cup 94 includes an inner annular wall 100, an outer annular wall 102 and an end wall 104 interconnecting annular walls 100 and 102. Retainer 58 is a substantially disc-shaped member having an outer edge 106 mounted to end wall 104 of cup 94. A portion of retainer 58 is spaced apart from end wall 104 to define a slot 108.

Retainer 58 includes a pair of axially extending tabs 109 positioned proximate to bearing cap 42. Tabs 109 restrict rotation of retainer 58 relative to axle housing 24. Sensor assembly 59 is mounted to retainer 58. Sensor assembly 59 includes a Hall element 110 having a substantially rectangular body. Hall element 110 includes a first face 112 extending substantially perpendicularly to the axis of rotation of axle shafts 28 and 30. Sensor assembly 59 also includes a pair of wires 114 extending from Hall element 110 that end at terminals 116 mounted within a connector 118. Connector 118 includes a body 120 extending through an aperture 122 formed in axle housing 24. The ends of the wire on wire coil 96 terminate at terminals 124 mounted within connector 118. In this manner, electrical connection to solenoid assembly 52 and sensor assembly 59 may be made from outside of axle housing 24.

A target 126 includes a bracket 128, a magnet 130 and a fastener 132. Bracket 128 includes a first leg 134 having an aperture 136 extending therethrough. Fastener 132 extends through aperture 136 and is used to mount target 126 to bearing cap 42. Bracket 128 includes a second leg 138 positioned at a right angle to first leg 134. Second leg 138 is substantially planar and positioned substantially parallel to first face 112 of Hall element 110. Magnet 130 is a substantially cylindrical disk-shaped member mounted to second leg 138. Accordingly, magnet 130 includes an outer surface 139 (shown in FIG. 7) positioned substantially parallel to first face 112. One skilled in the art will appreciate that the sensor and magnet may be re-oriented 90 degrees to the orientation shown in the Figures. As such, the orientation of sensor and magnet shown in the drawings is merely exemplary and should not limit the scope of the invention.

Draw plate 56 is positioned within slot 108 defined by retainer 58 and is coupled to actuating ring 54 via a plurality of fasteners 140. A washer 142 is positioned between cap 49 and actuating ring 54. Preferably, washer 142 is constructed from a non-ferromagnetic material so as to reduce any tendency for actuating ring 54 to move toward end face 74 of metallic cap 49 instead of differential case 40 during energization of solenoid assembly 52. A bearing 144 supports cup 94 on an outer journal 146 of cap 49.

Figure 8:
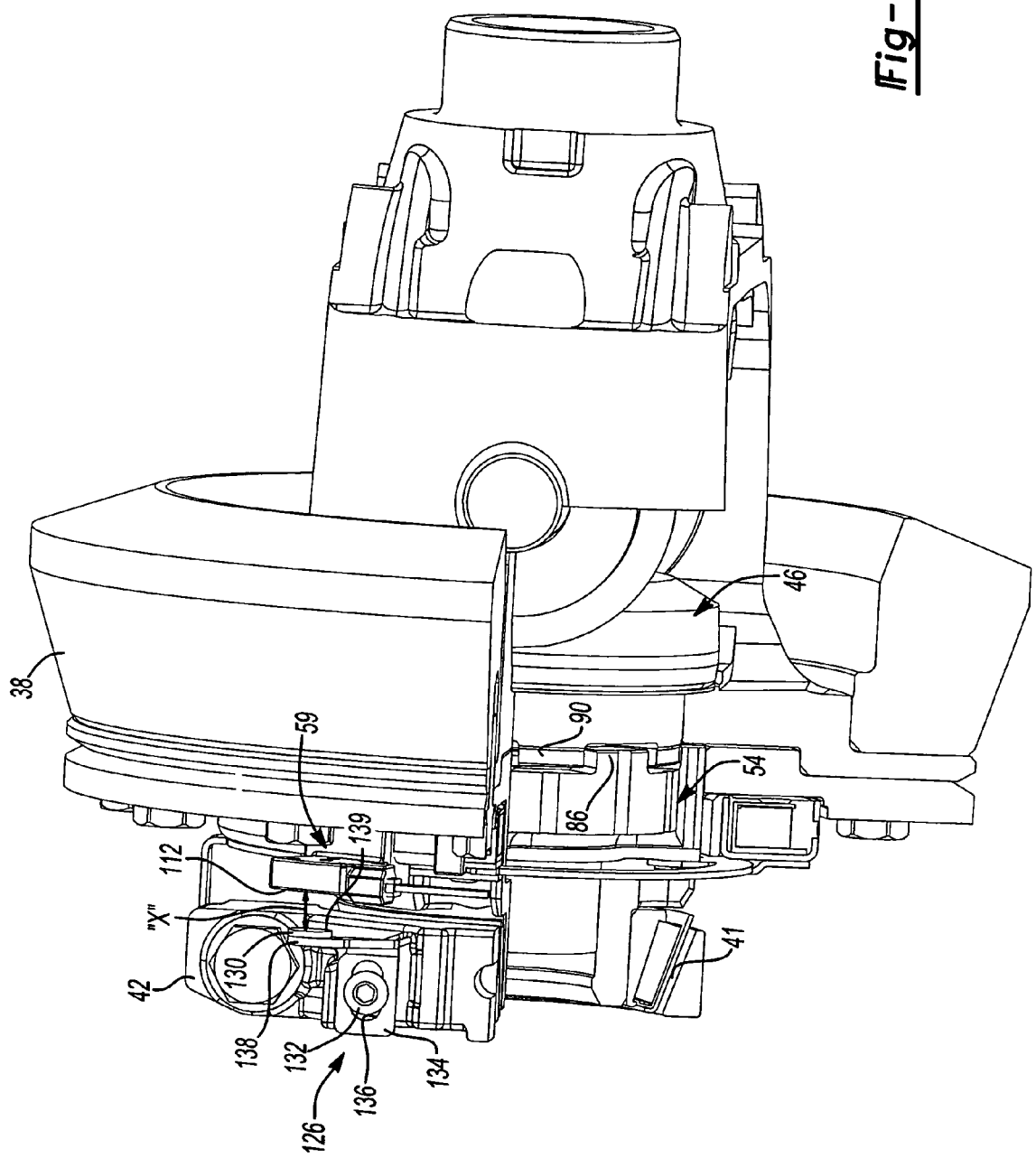
FIG. 8 is a fragmentary side view of the differential assembly of the present invention showing the actuating ring in a position drivingly engaged with the side gear.

Coil 96 is coupled to a controller 148 (FIG. 1) that operates to selectively energize and de-energize coil 96. During coil energization, a magnetic field is generated by current passing through coil 96. The magnetic field causes actuator and sensor assembly 48 to be drawn toward flange 60 of cap 49. As solenoid assembly 52 enters recess 64, dogs 86 of actuating ring 54 engage dogs 90 of side gear 46. Once the dogs are engaged, actuating ring 54 is in its engaged position and differential assembly 26 is in a fully locked condition as shown in FIG. 8. In the fully locked position, the Hall element 110 encompassed in sensor assembly 59 is spaced apart from outer surface 139 of magnet 130 by a distance "X." At distance "X," magnet 130 generates a predetermined magnetic field density. Sensor assembly 59 outputs a signal indicative of the axial position of actuating ring 54. This signal is used by controller 148 as verification that differential assembly 26 is in a fully locked position.

One skilled in the art will appreciate that the axially moveable electromagnet of the present invention provides a simplified design having a reduced number of components. Additionally, the present invention utilizes the entire differential case as the armature for the electromagnet. This allows a more efficient use of the available magnetic force. These features allow a designer to reduce the size of the electromagnet because the armature more efficiently utilizes the electromotive force supplied by the electromagnet. Such a compact design allows for minor modification of previously used components and packaging with a standard sized axle housing.

To place differential assembly 26 in the open, unlocked condition, current is discontinued to coil 96. The magnetic field ceases to exist once current to coil 96 is stopped. At this time, compression in spring 85 causes actuator and sensor assembly 48 to axially translate and disengage dogs 86 from dogs 90. Accordingly, side gear 46 is no longer drivingly coupled to differential case 40, thereby placing differential assembly 26 in the open condition shown in FIG. 7. When differential assembly is in the open, unlocked condition, Hall element 110 is positioned substantially closer to target 126 than when differential assembly 26 was in the locked position. Specifically, first face 112 is spaced apart from outer surface 139 of magnet 130 a distance "Y" when coil 96 is not energized. At distance "Y," the magnetic field density generated by magnet 130 is significantly greater than the field density at distance "X." Sensor assembly 59 is configured to output a signal to controller 148 indicating that actuating ring 54 is at a position where dogs 86 are disengaged from dogs 90 and the differential is in an open condition. It should also be appreciated that actuation and deactuation times are very short due to the small number of moving components involved. Specifically, no relative ramping or actuation of other components is required to cause engagement or disengagement of dogs 86 and dogs 90.

Electronic controller 148 controls the operation of actuator and sensor assembly 48. Electronic controller 148 is in receipt of data collected by a first speed sensor 150 and a second speed sensor 152 as shown in FIG. 1. First speed sensor 150 provides data corresponding to the rotational speed of axle shaft 28. Similarly, second speed sensor 152 measures the rotational speed of axle shaft 30 and outputs a signal to controller 148 indicative thereof. Depending on the data collected at any number of vehicle sensors such as a gear position sensor 154, a vehicle speed sensor 156, a transfer case range position sensor or a brake sensor 158 as shown in FIG. 1, controller 148 will determine if an electrical signal is sent to coil 96. Controller 148 compares the measured or calculated parameters to predetermined values and outputs an electrical signal to place differential assembly 26 in the locked position only when specific conditions are met. As such, controller 148 assures that an "open" condition is maintained when events such as anti-lock braking occur. The "open" condition is verified by the signal output from sensor assembly 59. Limiting axle differentiation during anti-lock braking would possibly counteract the anti-lock braking system. Other such situations may be programmed within controller 148.

Figure 9:
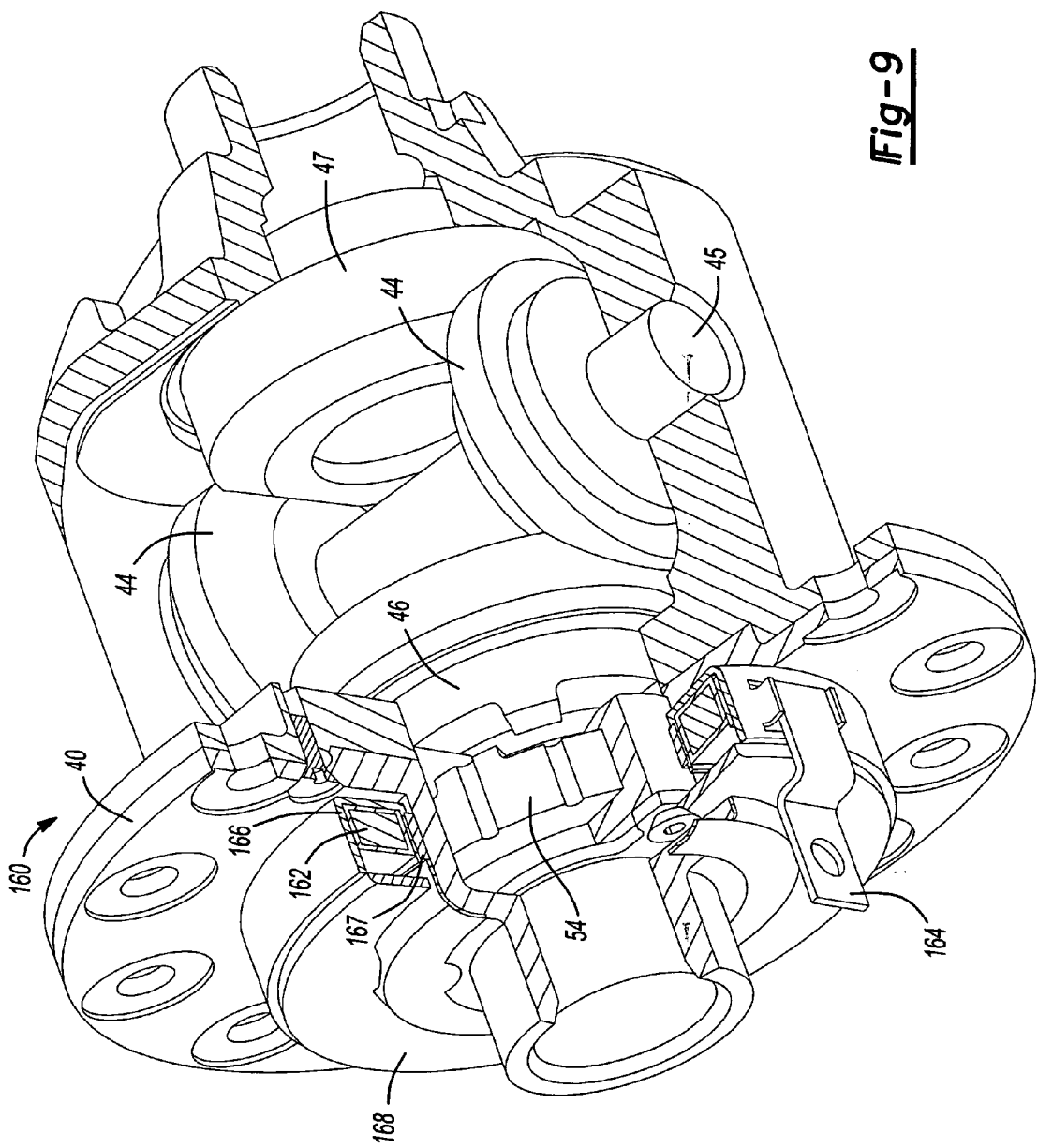
FIG. 9 is a fragmentary perspective of a second embodiment differential assembly.

FIG. 9 depicts a second embodiment differential assembly 160. Differential assembly 160 is substantially similar to differential assembly 26. For clarity, like elements have been identified with previously introduced reference numerals. Differential assembly 160 differs from differential assembly 26 in that a coil 162 is rotatably mounted on differential case 40 in a fixed axial position. An anti-rotation bracket 164 interconnects a cup 166 with the axle housing 24 (FIG. 3) to restrict coil 162 from rotation. A bearing 167 rotatably supports cup 166 to allow the differential case 40 to rotate relative to the coil 162 during operation of the differential assembly.

Through the use of a stationary coil 162, power supply and sensor wire routing complexities may be reduced because the wires no longer need to account for axial movement of the coil. As such, coil 162 does not axially translate nor rotate during any mode of operation of differential assembly 160. An axially moveable armature 168 is coupled to actuating ring 54. Armature 168 is shaped as an annular flat ring positioned proximate coil 162. Armature 168 and actuating ring 54 are drivingly coupled to differential case 40 and axially moveable relative to coil 162 and differential case 40. Armature 168 and actuating ring 54 are biased toward a disengaged, open differential, position shown in FIG. 9 by a compression spring as previously described in relation to differential assembly 26.

To place differential assembly 160 in a locked condition, coil 162 is energized to generate a magnetic field. Armature 168 is constructed from a ferromagnetic material. Accordingly, armature 168 and actuating ring 54 are axially displaced to drivingly engage actuating ring 54 with side gear 46 to place differential assembly 160 in a locked condition.

While a front drive axle assembly has been described in detail, it should be appreciated that the power transmitting device of the present invention is not limited to such an application. Specifically, the present invention may be used in rear drive axles, transaxles for front-wheel drive vehicles, transfer cases for use in four-drive vehicles and/or a number of other vehicular driveline applications.

Figure 10:
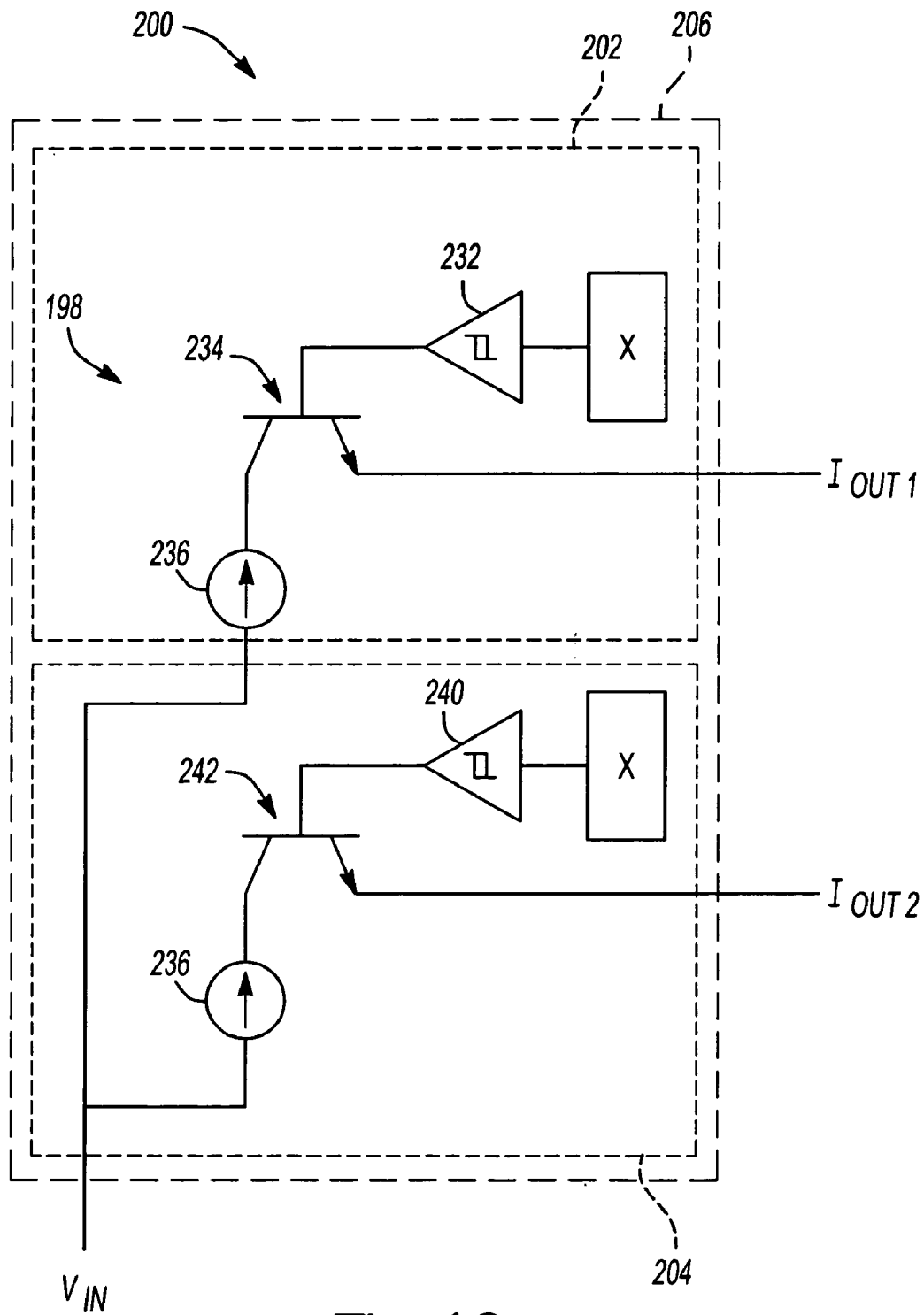
FIG. 10 is a schematic depicting a circuit including a second embodiment sensor assembly.

FIG. 10 depicts a circuit 198 having a second embodiment sensor assembly 200. Sensor assembly 200 includes a first Hall element 202, a second Hall element 204 and a body 206 encompassing both of the Hall elements. Sensor assembly 200 is shaped substantially similarly to sensor assembly 59. Sensor assembly 200 is positioned in communication with a differential assembly in a substantially similar manner to sensor assembly 59. Accordingly, the description relating to the mounting of sensor assembly 200 within the axle assembly will not be reiterated.

Due to the nature of Hall effect devices, permanent magnets and the general environment in which sensor assembly 200 is required to function, a very large mechanical hysteresis is inherent in the system. Mechanical hysteresis in this instance is best described as the absolute distance the sensor assembly must travel in relation to the target magnet in order to change its output state. The Hall effect device switches state, or outputs a different signal, based on the Hall element being exposed to a changing magnetic field density. The Hall effect device may be configured to start switching at a predetermined magnetic field density described as its operating point (Bop) and the field density must change an amount equal to the inherent hysteresis (Bhys) of the Hall effect device in order to switch.

Figure 11:
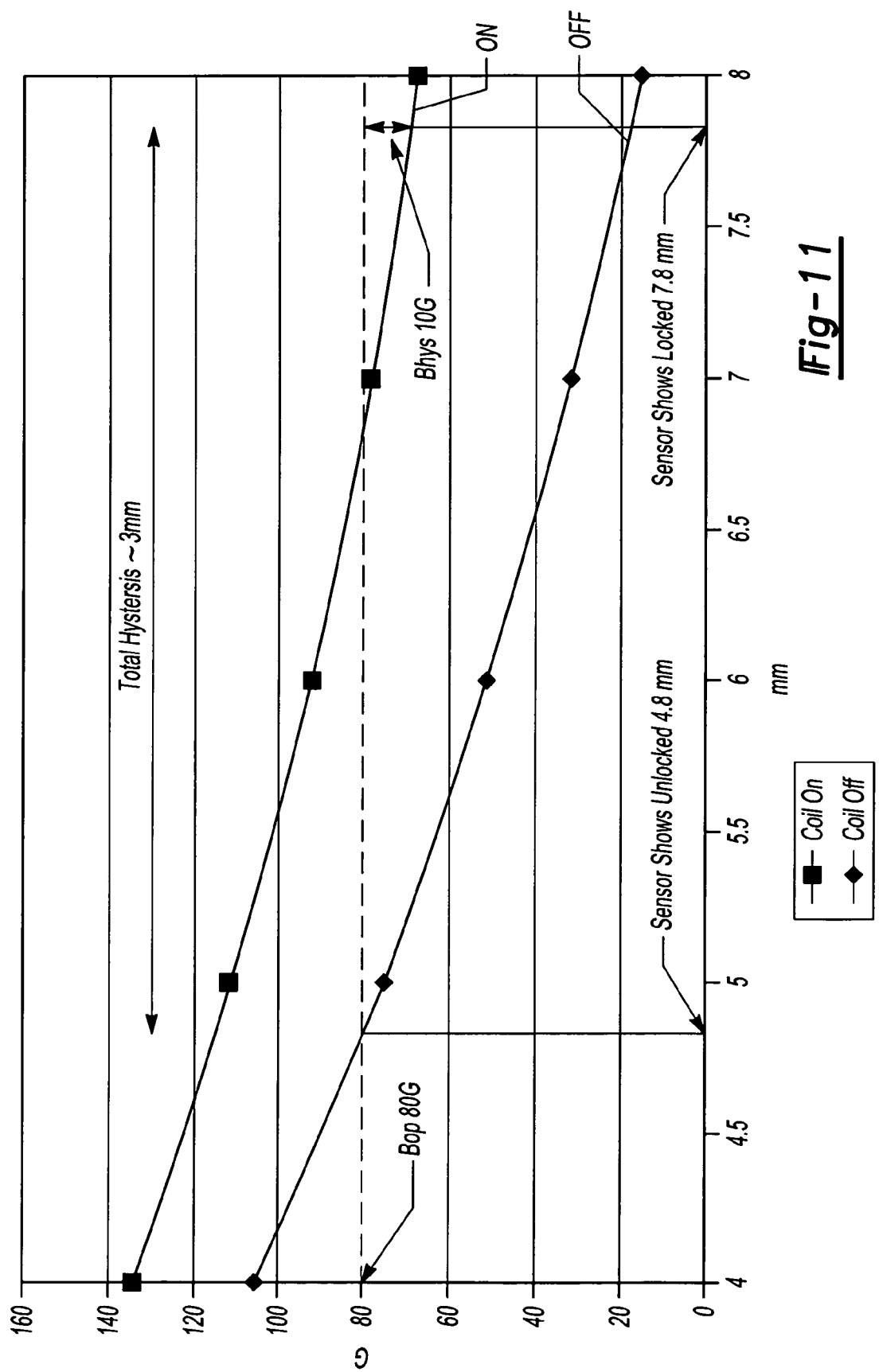
FIG. 11 is a graph showing magnetic field density vs. distance for a first embodiment sensor assembly.

FIG. 11 is a graph showing magnetic field density versus distance for the first embodiment sensor assembly 59 shown in FIGS. 4-8. As shown in FIG. 11, permanent magnet 130 generates an exponentially decaying field density, measured in gauss versus the distance traveled in millimeters. For example, if Hall element 110 was programmed to switch at a Bop of 80 gauss and had a Bhys of 10 gauss, Hall element 110 would initiate a switch at 80 gauss and change its state at 70 gauss. Because a magnetic field is generated when coil 96 is energized, two distinct gauss curves are created. The upper curve depicts the field density present when the electromagnet of solenoid assembly 52 is energized. The lower curve represents the magnetic field density generated by the permanent magnet alone when the coil 96 is not energized. As shown, a relatively large hysteresis is introduced into the system by operation of solenoid assembly 52.

In the embodiment depicted in FIG. 11, sensor assembly 59 moves from a location where distance "Y" equals 4 mm and distance "X" equals 8 mm. Sensor assembly 59 does not output a signal indicating that the differential assembly is in the locked condition until sensor assembly 59 reaches a distance of 7.8 mm of spacing between first face 112 and outer surface 139. During coil 96 deenergization, sensor assembly 59 does not output a signal indicating that the differential assembly is unlocked until the spacing between the Hall element and the permanent magnet is 4.8 mm. As such, a total mechanical hysteresis of approximately 3 mm exists with the single sensor embodiment. Depending on the operational characteristics of the mechanical system including sensor assembly 59, this magnitude of hysteresis may or not be acceptable.

Figure 12:
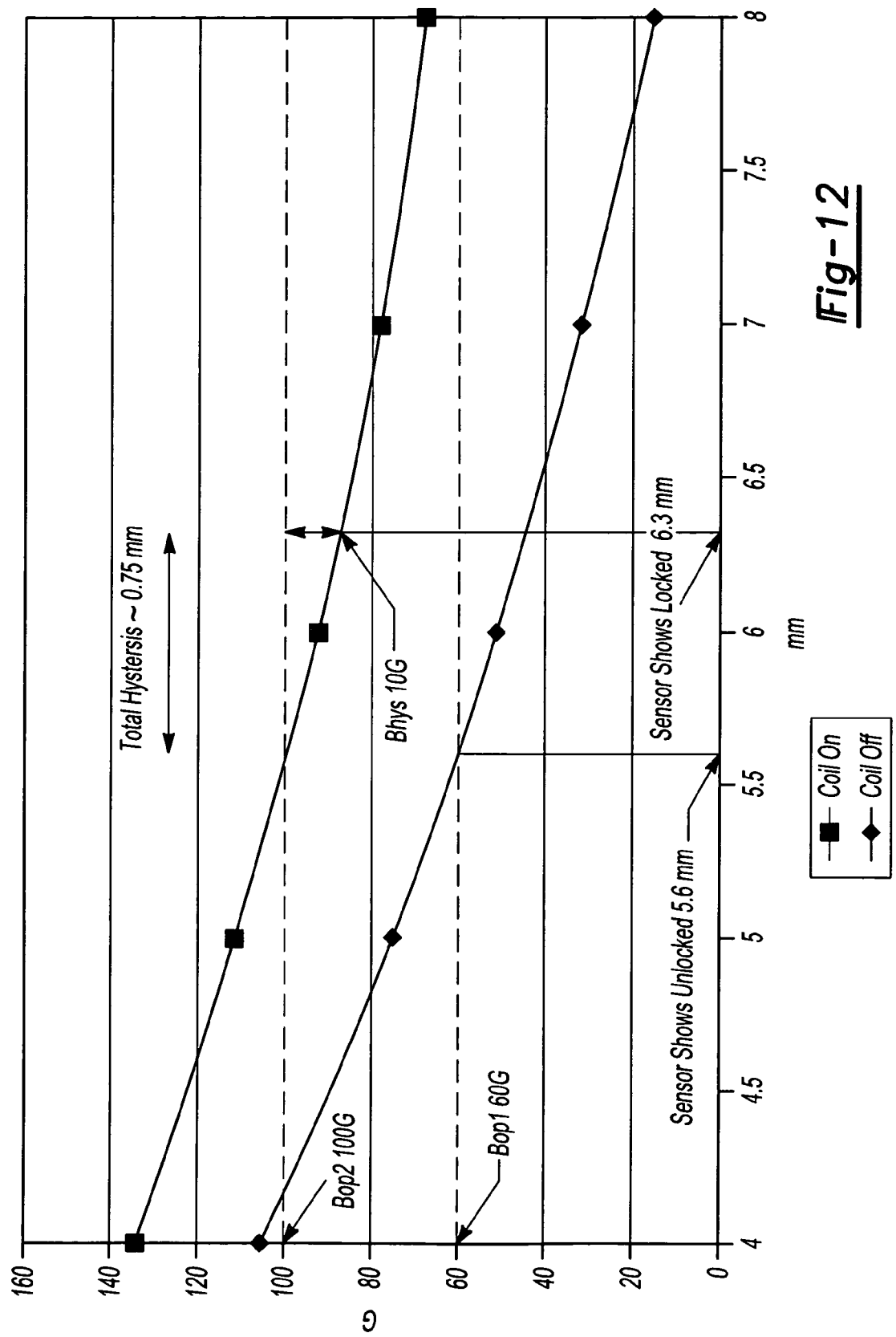
FIG. 12 is a graph showing magnetic field density vs. distance for a second embodiment sensor assembly.

FIG. 12 is a graph showing magnetic field density versus distance for the second embodiment sensor assembly 200 shown in FIG. 10. To reduce the magnitude of mechanical hysteresis, Hall elements 202 and 204 of sensor assembly 200 are configured in accordance with FIGS. 10 and 12. First Hall element 202 is set to have an operating point of 60 gauss while second Hall element 204 is set to have an operating point of 100 gauss. During operation, second Hall element 204 outputs a signal indicating that the differential assembly is in the locked condition once the magnetic field density reduces from 100 gauss to 90 gauss. This condition occurs when the spacing between second Hall element 204 and outer surface 139 of magnet 130 is approximately 6.3 mm. At electromagnet deenergization, first Hall element 202 outputs a signal indicative of an open differential condition once the magnetic field density changes from 50 to 60 gauss. This condition exists when first Hall element 202 is spaced from outer surface 139 a distance of approximately 5.6 mm. One skilled in the art will appreciate that the total mechanical hysteresis is now approximately 0.75 mm when using two Hall elements with different operating points.

The circuit 198 depicted in FIG. 10 includes first Hall effect sensor 202 and second Hall effect sensor 204. First Hall effect sensor 202 is coupled in series with a differential gain amplifier 232. Differential gain amplifier 232 is coupled to the base of a current gain transistor 234. A constant current source 236 is supplied to the collector leg of current gain transistor 234. The emitter leg of current gain transistor 234 provides an output signal labeled as $I_{OUT1}$.

In similar fashion, second Hall effect sensor 204 is connected in series with a differential gain amplifier 240. Differential gain amplifier 240 is coupled to the base of a current gain transistor 242. Constant current source 236 is supplied to the collector leg of current gain transistor 242. The emitter leg of current gain transistor 242 provides an output signal labeled as $I_{OUT2}$. Controller 148 analyzes $I_{OUT1}$ and $I_{OUT2}$ to determine the operating mode of differentiation as being locked or unlocked. When both $I_{OUT1}$ and $I_{OUT2}$ are low or zero, controller 148 determines that the differential is operating in the locked mode. When $I_{OUT1}$ and $I_{OUT2}$ are both high or one, controller 148 determines that the differential is operating in the unlocked mode.

Figure 13:
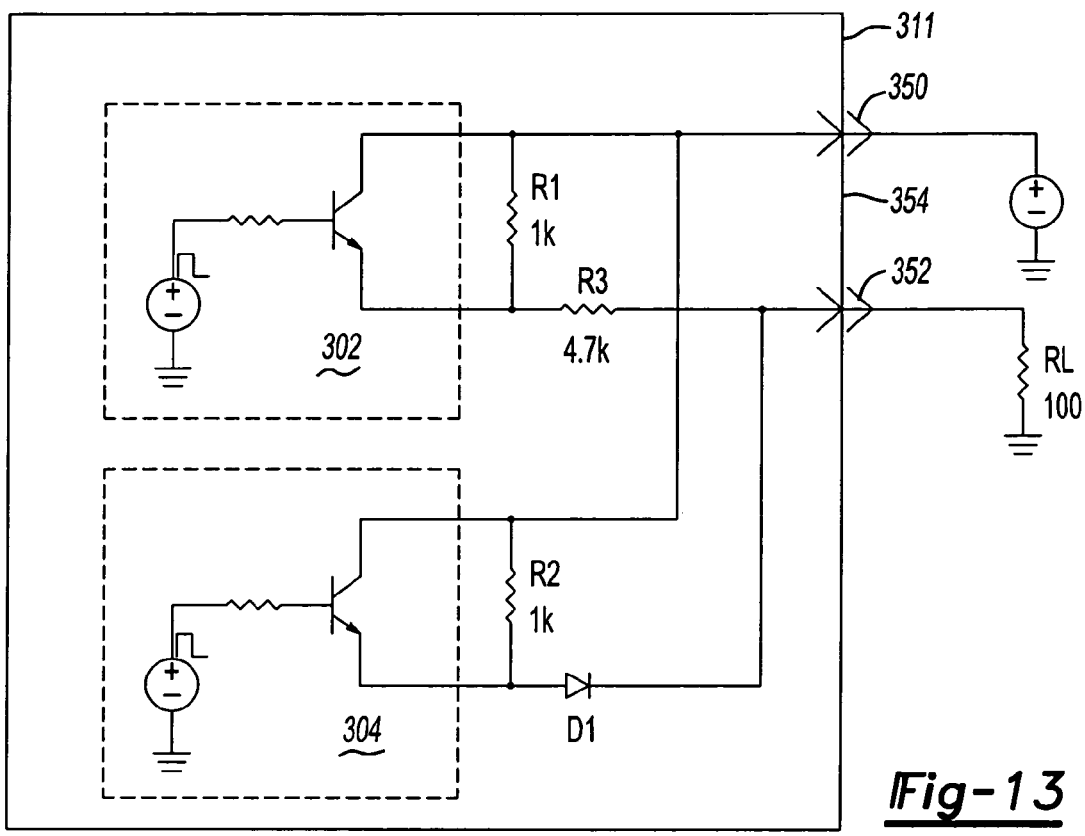
FIG. 13 is a schematic depicting a circuit for a two wire, dual sensor arrangement identified as Sensor Configuration 1.

FIG. 13 depicts an alternate embodiment dual Hall sensor circuit 300 operable to output a signal indicative of the position of a moveable member within a power transmission device. Circuit 300 may be implemented in conjunction with the lockable differential assembly previously described. Furthermore, it is contemplated that circuit 300 may be used in conjunction with any number of power transmission subsystems that include an axially moveable member.

Figure 14:
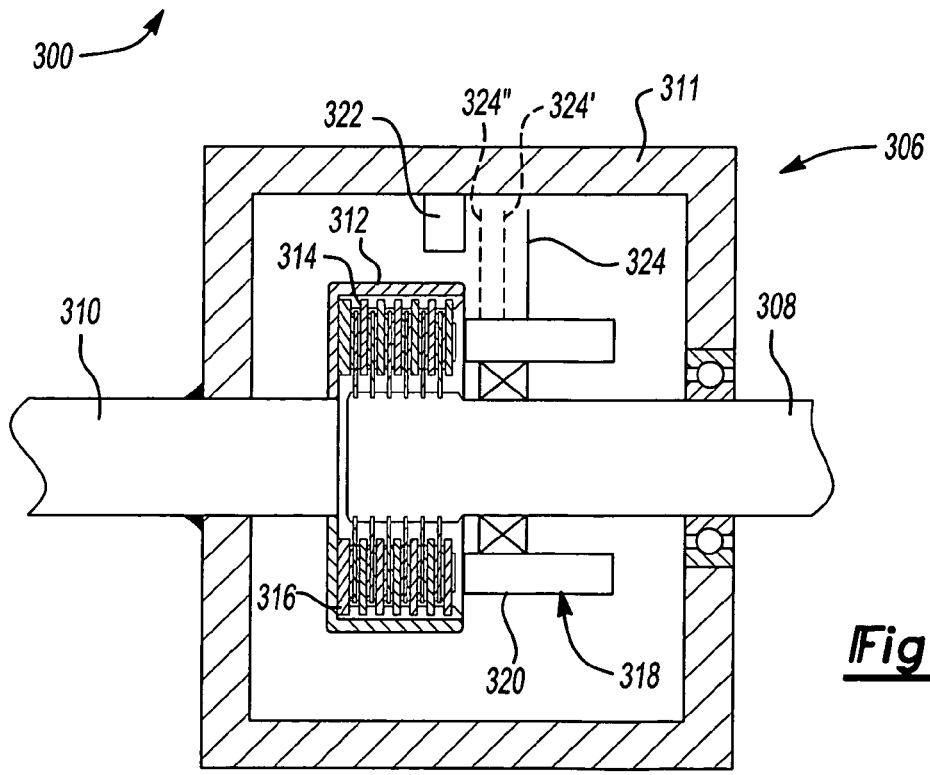
FIG. 14 is a schematic diagram depicting an alternate embodiment power transmission device.

For example, FIG. 14 shows a power transmission device 306 operable to selectively transfer torque from a first rotatable shaft 308 to a second rotatable shaft 310. The rotatable shafts are at least partially positioned within a housing 311 and are selectively drivingly interconnected by a clutch assembly 312. Clutch assembly 312 includes a plurality of outer friction plates 314 slidably coupled to second shaft 310 and a plurality of inner friction plates 316 slidably coupled to shaft 308. Outer plates 314 are interleaved with inner plates 316. An actuator 318 is operable to axially displace an apply plate 320 such that a compressive force may be selectively applied to the clutch 312. The output torque of clutch 312 may be varied according to the input force generated by actuator 318.

A sensor assembly 322 is mounted to housing 311. A target 324 is mounted to axially moveable apply plate 320. In operation, actuator 318 is operable to move apply plate 320 between at least three discrete positions. These positions are represented by target 324 being shown in solid line representation when apply plate 320 is at the first or returned position where no torque is transferred through clutch 312, a second position as denoted by target 324' in hidden line representation and a third position shown as target 324" also in hidden lines. At position 324', actuator 318 moves apply plate 320 to take up axial clearance between outer plates 314 and inner plates 316 to place the clutch in a ready mode. At this position, clutch 312 transmits minimal torque, if any, between shaft 308 and shaft 310. However, very slight movement of apply plate 320 toward the clutch 312 will cause the clutch to generate a significant amount of torque in a relatively short period of time. In this manner, torque delivery will not be delayed due to the actuator having to travel large distances to account for the clearance between the actuator plate and the friction plates of the clutch.

When the target is at position 324", actuator 318 has driven apply plate 320 in full engagement with clutch 312 and torque is being transferred through the clutch. Accordingly, it may be beneficial to construct a sensor circuit operable to output signals indicating when an axially moveable member such as apply plate 320 is at one of three locations. Alternatively, only two locations may need to be determined if the sensor arrangement is used in a device such as differential assemblies 26 or 160 because the axially moveable actuating ring 54 is typically in one of two locations. Actuating ring 54 is either in the fully returned position when the differential is in an open condition or the fully advanced position when the differential is in the locked condition. Various circuit embodiments and sensor configurations will be described hereinafter. Depending on the sensor configuration, the circuit may output signals indicating that the target is in one of two different zones or that the target is located within one of three different zones of linear position.

Figures 15, 16:
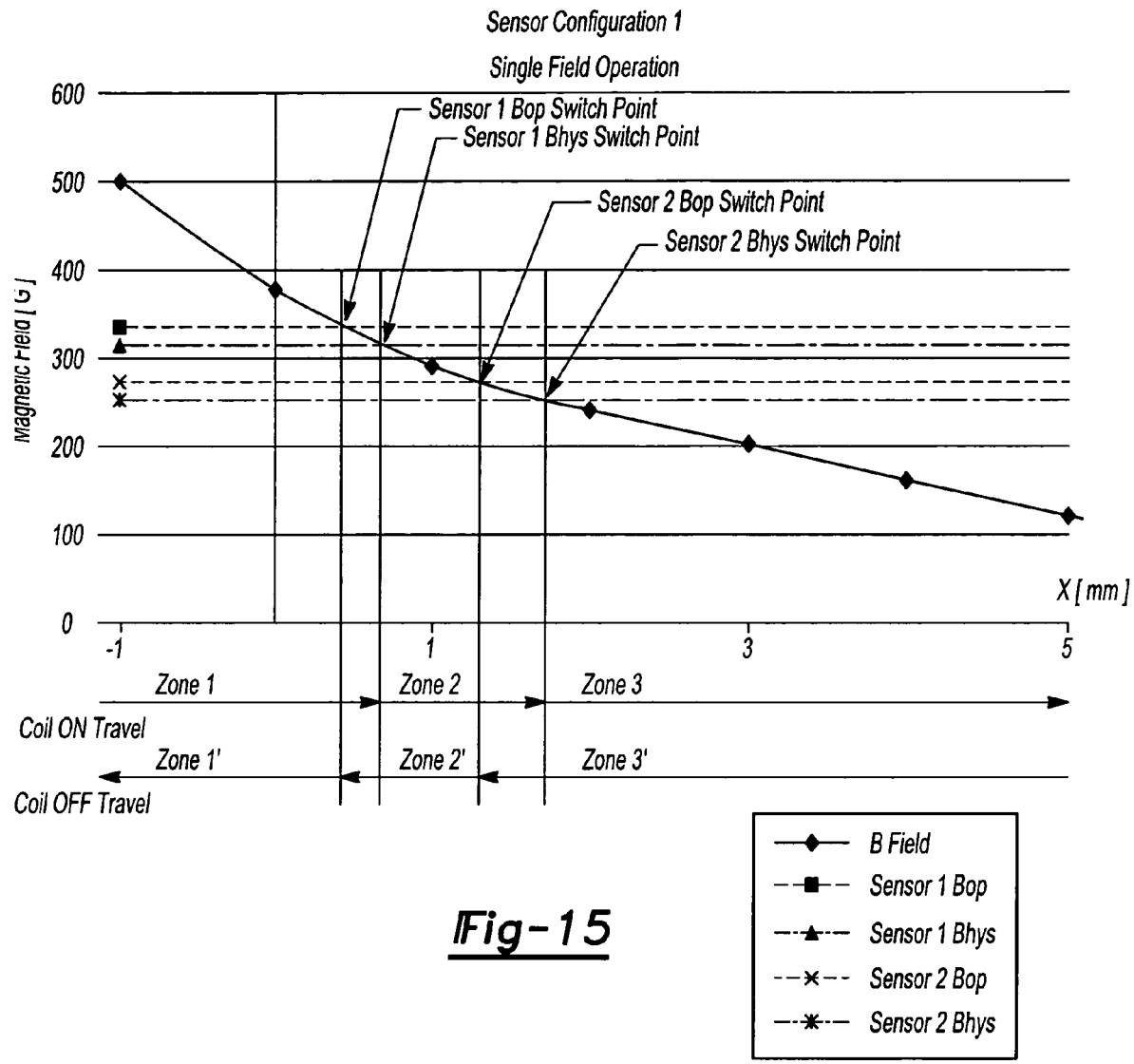
FIG. 15 is a graph showing magnetic field density versus distance for a dual Hall sensor arrangement operating in a single magnetic field per Sensor Configuration 1.
FIG. 16 is a table depicting the output of the circuit of FIG. 13 based on the operational state of the sensors.

Referring again to FIG. 13, circuit 300 depicts a Sensor Configuration 1. FIGS. 15 and 16 also relate to Sensor Configuration 1. Circuit 300 includes a first Hall sensor 302, a second Hall sensor 304, a number of resistors, R1, R2 and R3 as well as a diode D1 electrically interconnected as shown. These resistors and the diode are located within the housing of the power transmission device. A first pin 350 and a second pin 352 exit the housing at a bulkhead connector 354. First pin 350 is connected to a DC power source while second pin 352 is connected to a load resistor RL. Load resistor RL functions as a current sensing element and provides a voltage output signal proportional to Iout. One skilled in the art will appreciate that minimizing the number of wires, terminals, pins or other electrical connectors passing through the wall of the housing is beneficial. For example, the impact on the housing structural integrity is minimized and the aperture extending through the housing may be more easily sealed if the size of the aperture is minimized.

FIG. 16 represents a state diagram defining the output of circuit 300 based on the operational states of sensor 302 and sensor 304. The table of FIG. 16 identifies sensor 302 as sensor 1 and sensor 304 as sensor 2. As is noted by reviewing the column labeled Sensor Iout, Configuration 1 outputs 5 mA when the distance between the Hall effect sensors and the target is within zone 1 or 2. Both sensor 302 and sensor 304 are in the OFF state when the distance between the Hall effect sensors and the target is within zone 3. When both sensors are in the OFF state, Iout equals 15 mA. Because the Hall effect sensors include inherent hysteresis, the distance at which the state of the sensor changes depends on whether the magnetic field density is increasing or decreasing. Accordingly, zones 1, 2 and 3 vary slightly depending on the direction of travel of the axially moveable member. For example, sensor 2 switches from the ON state to the OFF state after the magnetic field density changes from Bop past Bhys. This change represents the spacing between the Hall effect sensor and the target as increasing at the point of transition from zone 2 to zone 3 as shown at approximately 1.75 mm. If the Hall effect sensor is exposed to an increasing magnetic field density, sensor 2 is shown to switch from the OFF to the ON state only after the magnetic field density increases from Bhys past Bop. This condition is shown to occur at approximately a 1.3 mm spacing as zone 3' is exited and zone 2' is entered. As is illustrated by the graph, the beginning of zone 3 does not exactly correspond to the ending of zone 3'. This "tolerance" of the distance at which zone 2 ends and zone 3 starts should be accounted for in the logic of the controller utilizing the information output from circuit 300.

Figure 17:
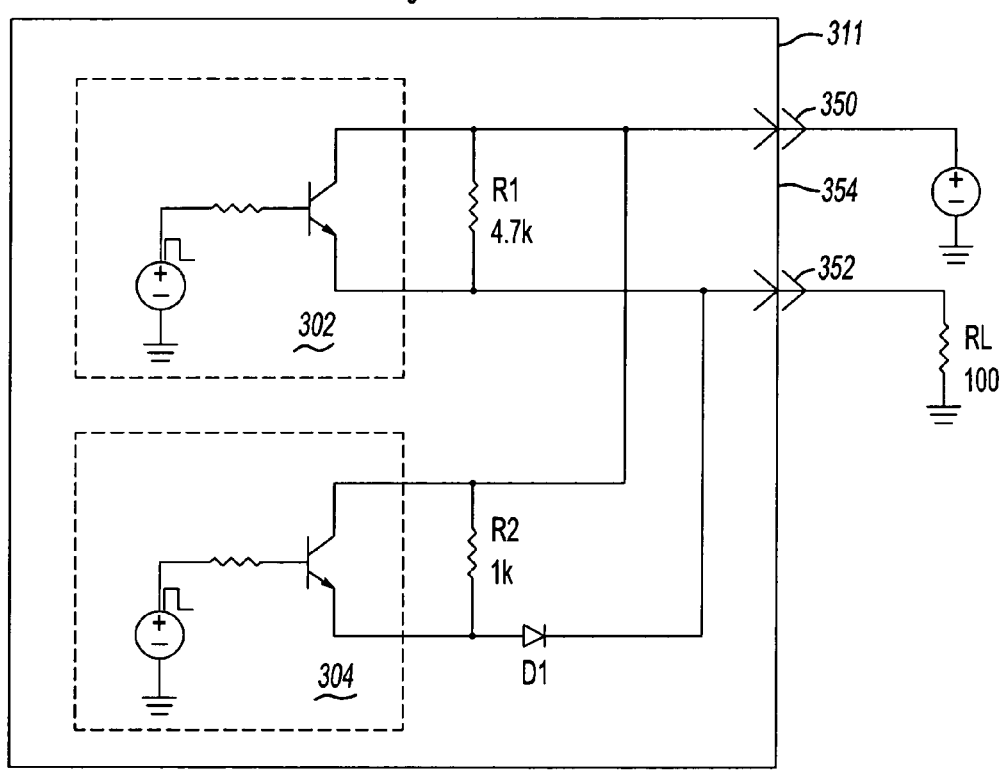
FIG. 17 is a schematic depicting an alternate embodiment circuit for a two wire, dual sensor arrangement identified as Sensor Configuration 2.
Figures 18, 19:
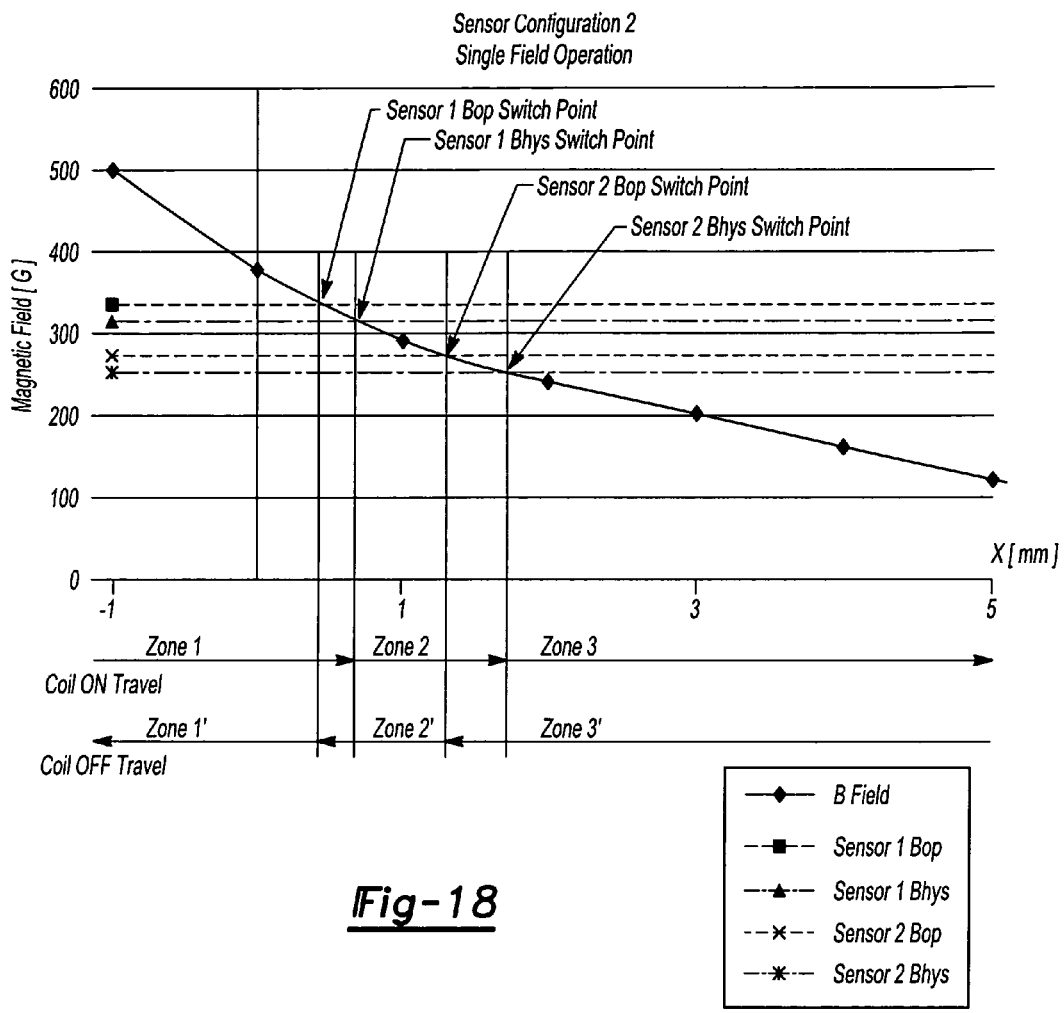
FIG. 18 is a graph showing magnetic field density versus distance for Sensor Configuration 2.
FIG. 19 is a table depicting the output of the circuit of FIG. 17.

FIGS. 17-19 depict an electrical circuit 360 substantially similar to circuit 300 but having a different topology, identified as Sensor Configuration 2. Circuit 360 includes first sensor 302 and second sensor 304 wired in communication with resistors R1 and R2 as well as diode D1. The resistance value for R1 has been changed and R3 has been removed. First pin 350 and second pin 352 exit the housing of the power transmission device as previously described. Pin 350 is coupled to a DC power source and pin 352 is coupled to a current sensing load resistor RL. FIG. 19 includes a column labeled Sensor Iout which represents the output of the circuit 360 where sensor 1 has a Bop greater than the Bop of sensor 2. FIG. 19 includes another column entitled Alternate Sensor Iout which represents the output of circuit 360 if the operating points of sensors 1 and 2 were switched. One skilled in the art will appreciate that three different current levels are provided depending on the state of sensor 1 and sensor 2 according to the column labeled Sensor Iout. Specifically, Iout equals 5 mA when the spacing between the Hall effect sensors and the target is within zone 1. Iout equals 15 mA when the spacing between the sensors and the target is within zone 2. Iout equals 21 mA when the spacing between the sensors and the target is within zone 3. The versatility of the use of two programmable Hall effect sensors is illustrated by reviewing the Alternate Sensor Iout column and noting that the same circuit may be used to provide an indication when the spacing between Hall sensors is within one of two areas. Different signals are output if the spacing lies within zone 1 or within zones 2 or 3. Iout equals 5 mA only when sensor 1 and sensor 2 are both in the ON state. Otherwise, if one or both of the sensors are in the OFF state, 21 mA is output. Therefore, Sensor Configuration 2 is easily programmed to provide a two position sensing arrangement or a three position sensing arrangement.

Figure 20:
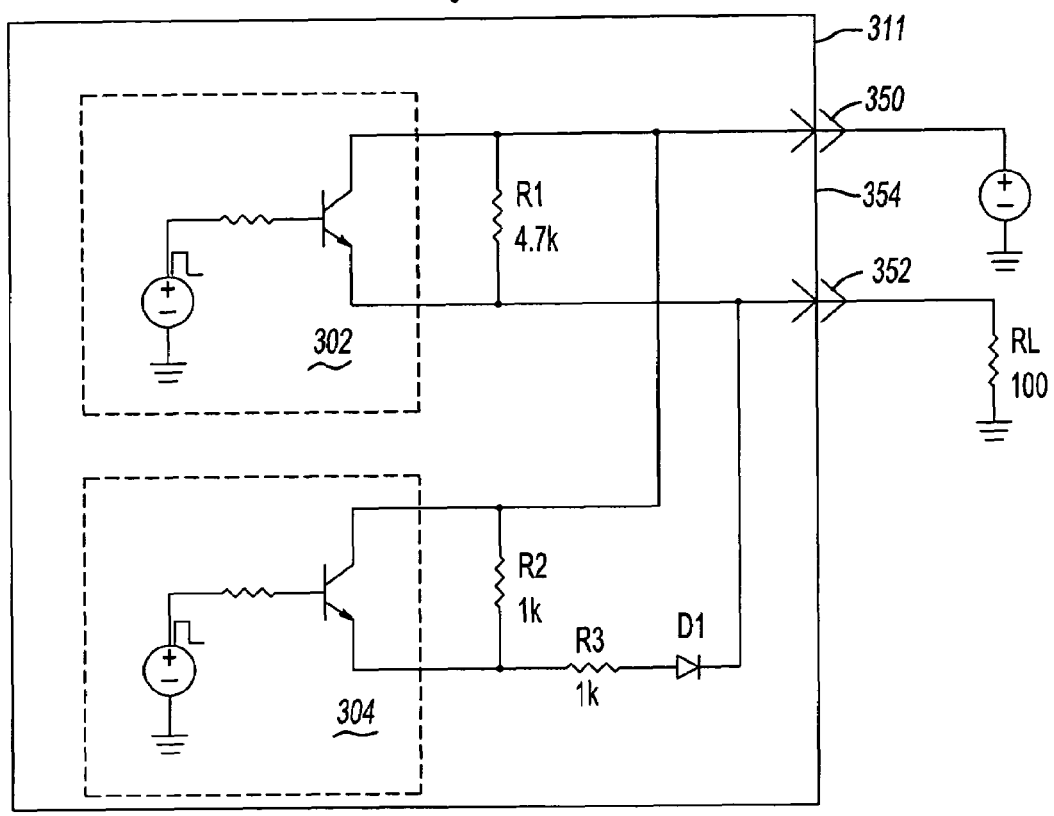
FIG. 20 is a schematic depicting an alternate embodiment circuit identified as Sensor Configuration 3.
Figures 21, 22:
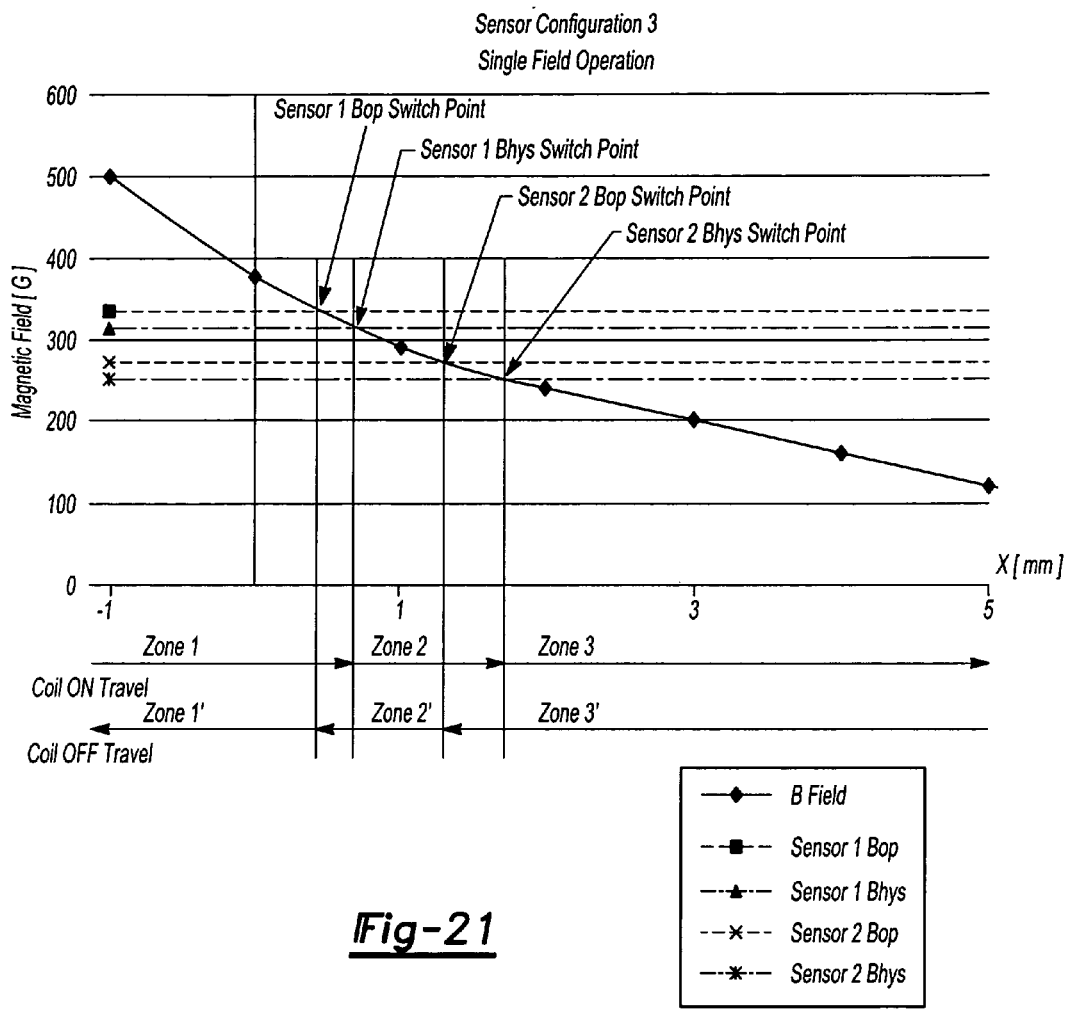
FIG. 21 is a graph showing magnetic field density versus distance for Sensor Configuration 3.
FIG. 22 is a table depicting the output of the circuit of FIG. 20.

Another circuit configuration 370 is represented by FIGS. 20-22. Circuit 370 or Sensor Configuration 3 is substantially similar to Sensor Configurations 1 and 2 with minor changes to the circuit. The circuit modifications cause the magnitude of the output current levels to change. Furthermore, different sensor state combinations provide different outputs. The Sensor Iout column shows that 3 mA is output in zone 1 and zone 1' while 21 mA will be output when the spacing between the sensor and the target is within zone 2, zone 2', zone 3 or zone 3'.

Figure 23:
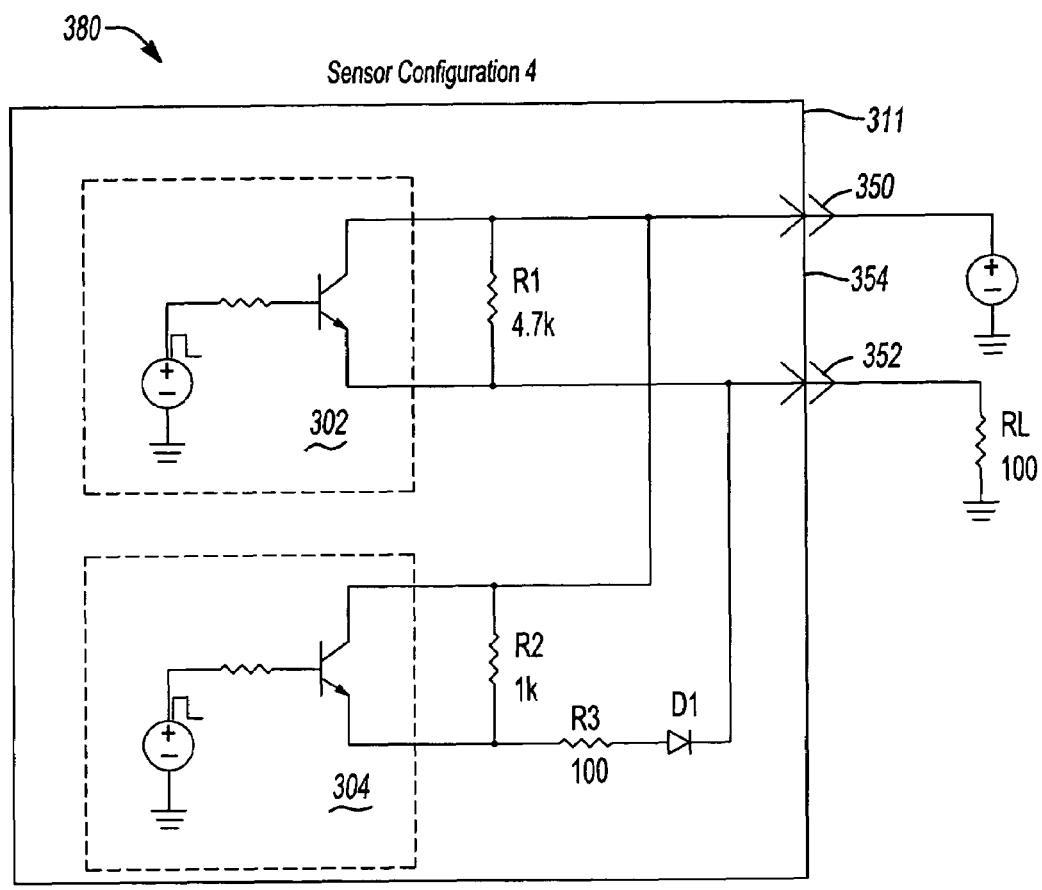
FIG. 23 is a schematic depicting an alternate embodiment circuit identified as Sensor Configuration 4.
Figures 24, 25:
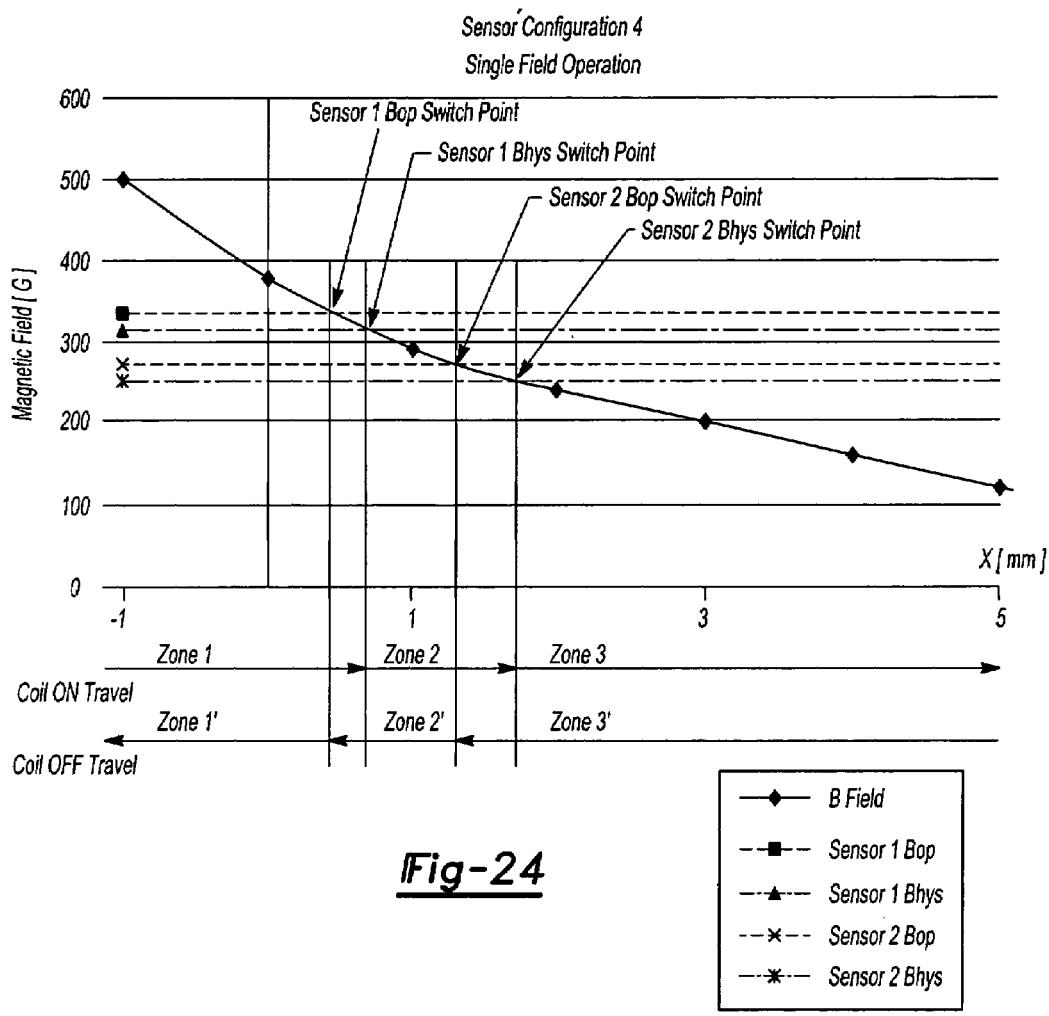
FIG. 24 is a graph showing magnetic field density versus distance for Sensor Configuration 4.
FIG. 25 is a table depicting the output of the circuit of FIG. 23.
Figure 26:
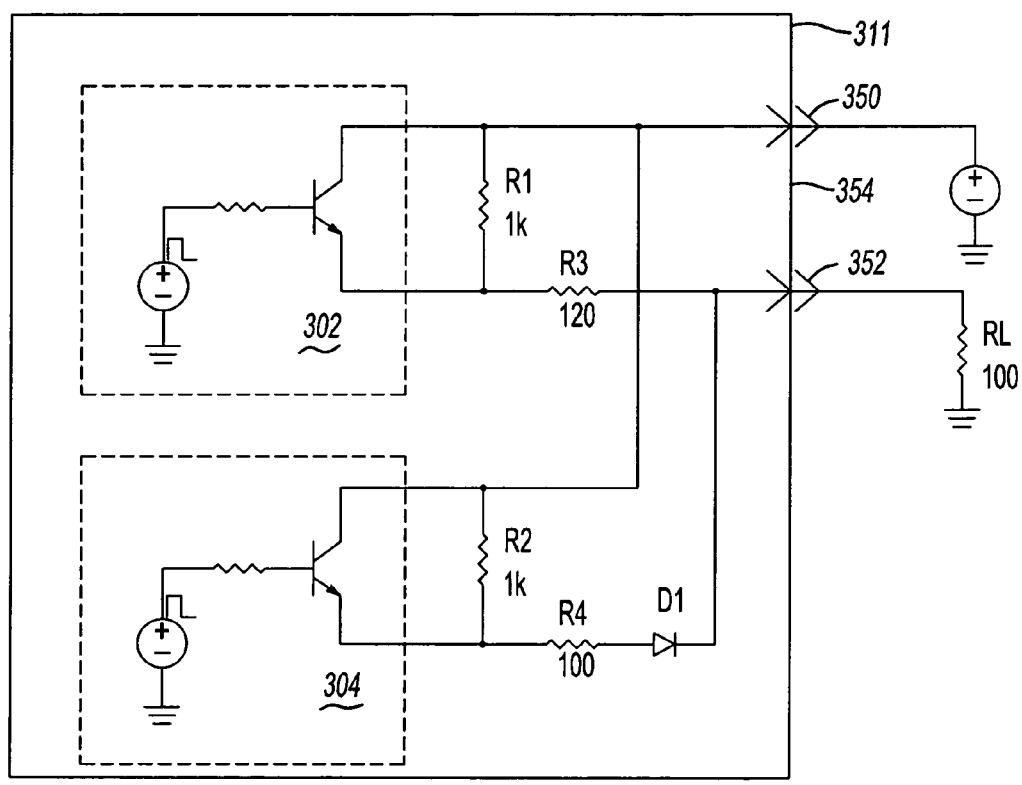
FIG. 26 is a schematic depicting an alternate embodiment circuit identified as Sensor Configuration 5.
Figures 27, 28:
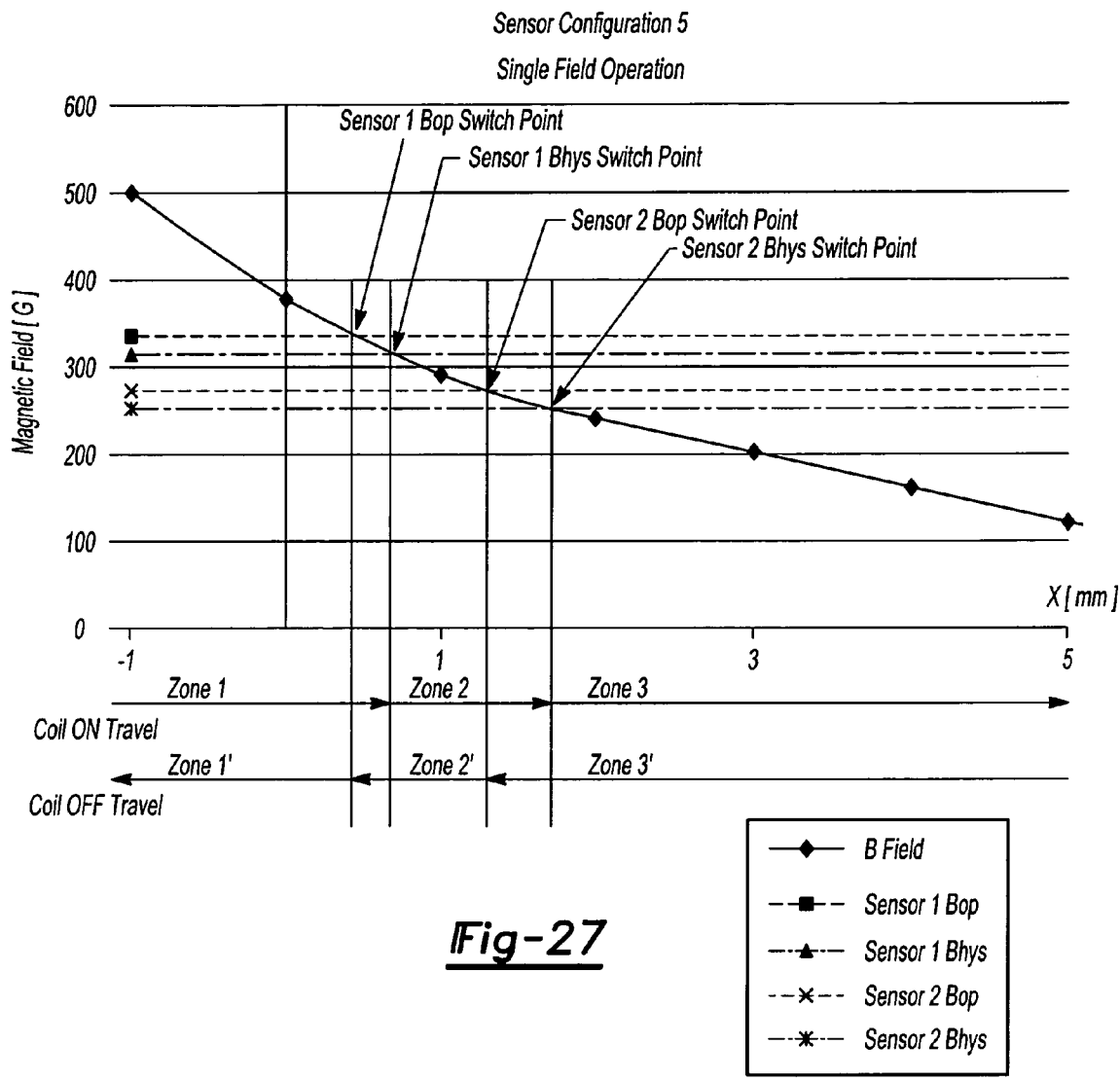
FIG. 27 is a graph showing magnetic field density versus distance for Sensor Configuration 5.
FIG. 28 is a table depicting the output of the circuit of FIG. 26.
Figure 29:
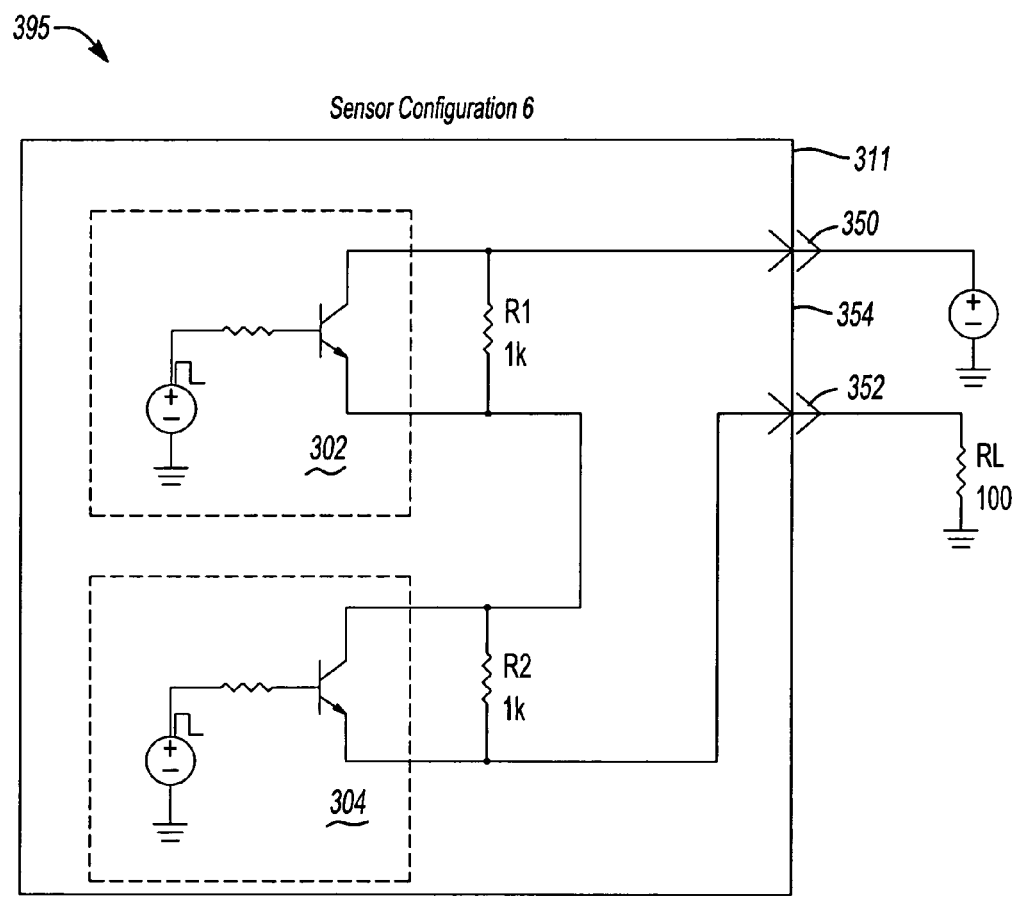
FIG. 29 is a schematic depicting another alternate embodiment circuit identified as Sensor Configuration 6.
Figures 30, 31:
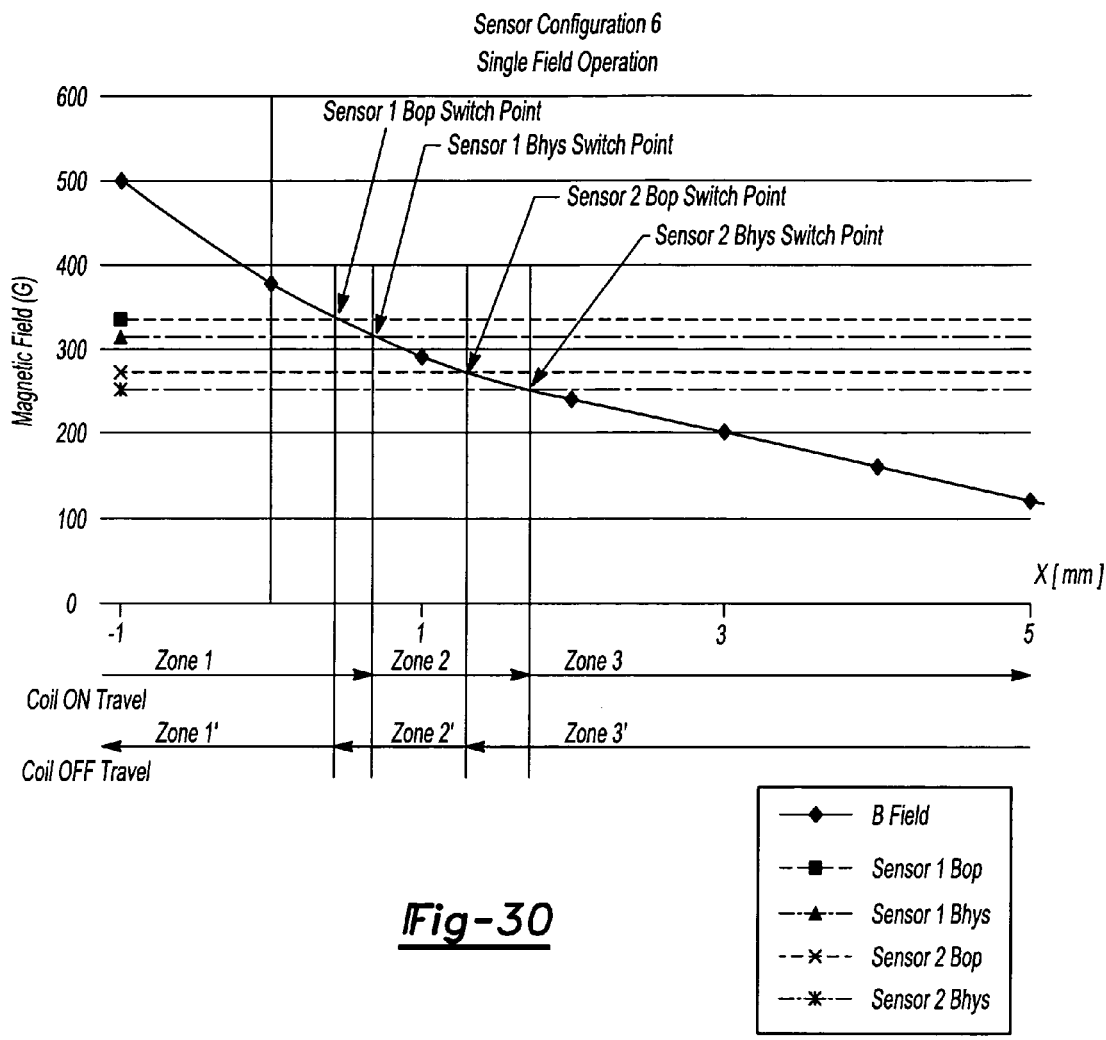
FIG. 30 is a graph showing magnetic field density versus distance for Sensor Configuration 6.
FIG. 31 is a table depicting the output of the circuit of FIG. 29.

FIGS. 23-25 relate to Sensor Configuration 4 having a circuit 380. FIGS. 26-28 correspond to Sensor Configuration 5 having a circuit 390. FIGS. 29-31 depict Sensor Configuration 6 having a circuit 395. Each of these configurations is substantially similar to Sensor Configurations 1-3 previously described in detail. As such, like elements will retain their previously introduced reference numerals. Sensor Configurations 4, 5 and 6 further illustrate the versatility of the present invention by constructing simple circuits using two Hall elements to output signals indicative of the position of an axially moveable component within a power transmission device.

Figures 32, 33:
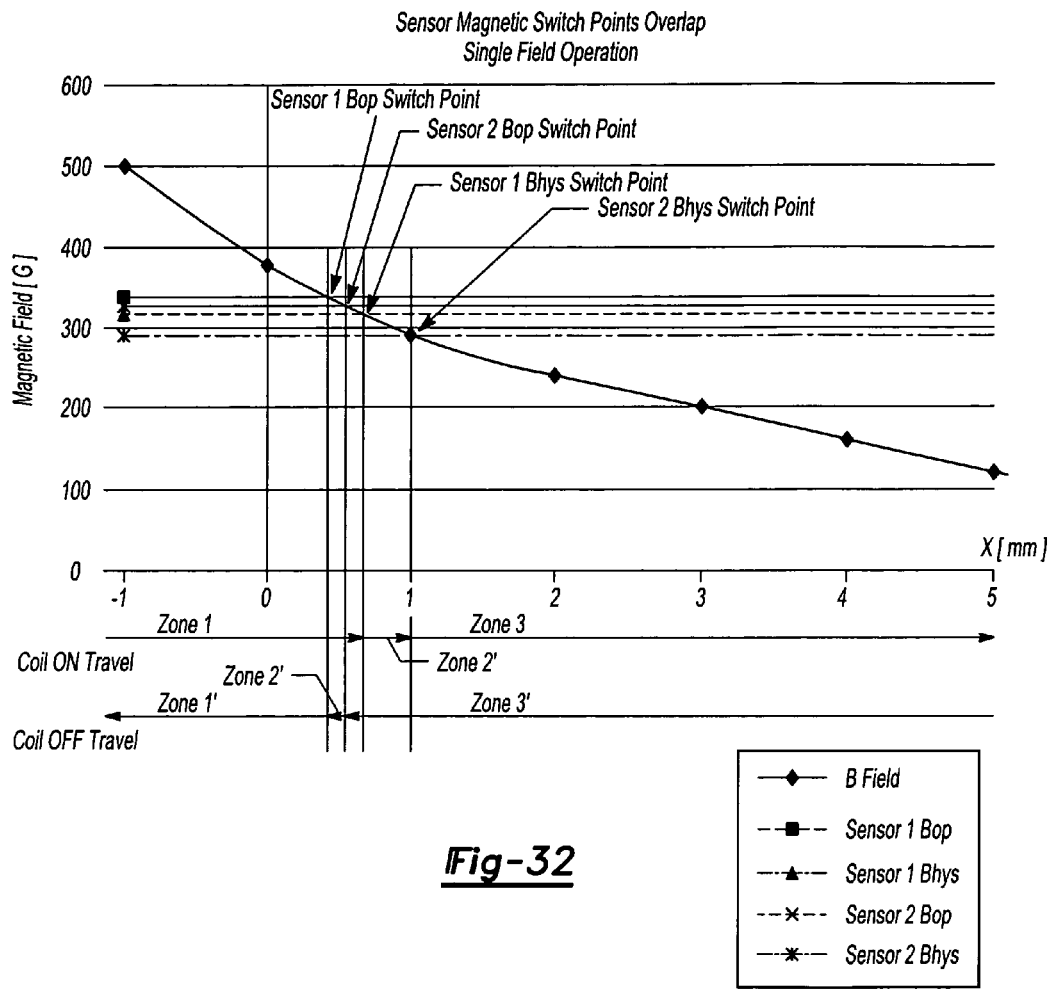
FIG. 32 is a graph showing magnetic field density versus distance for Sensor Configuration 6 where the Hall elements are programmed to have overlapping operational magnetic field ranges.
FIG. 33 is a table depicting the output of Sensor Configuration 6 having operational switch points as defined in FIG. 32.
Figures 34, 35:
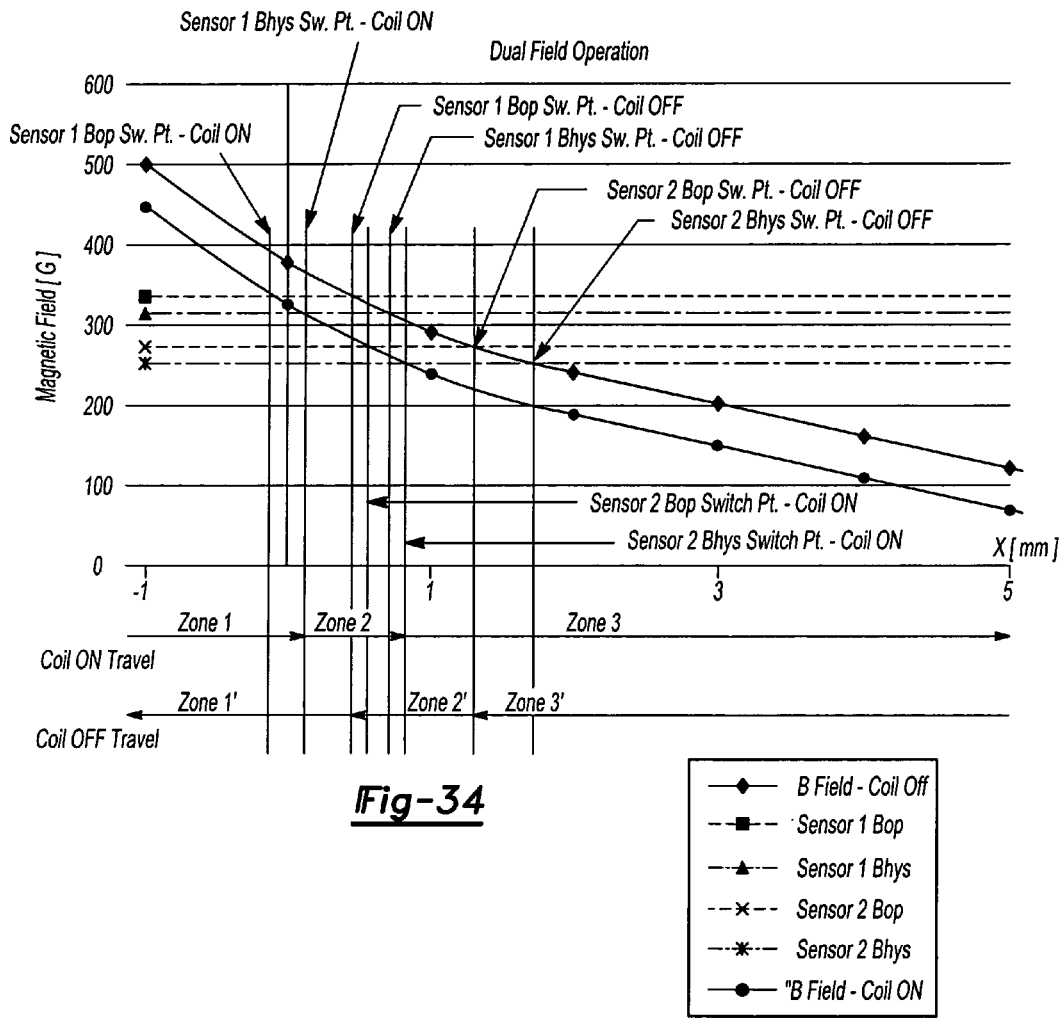
FIG. 34 is a graph showing magnetic field density versus distance for a circuit constructed according to Sensor Configuration 6 where the Hall effect sensors operate within dual magnetic fields.
FIG. 35 is a table depicting the output of the circuit according to Sensor Configuration 6 and FIG. 34.
Figures 36, 37:
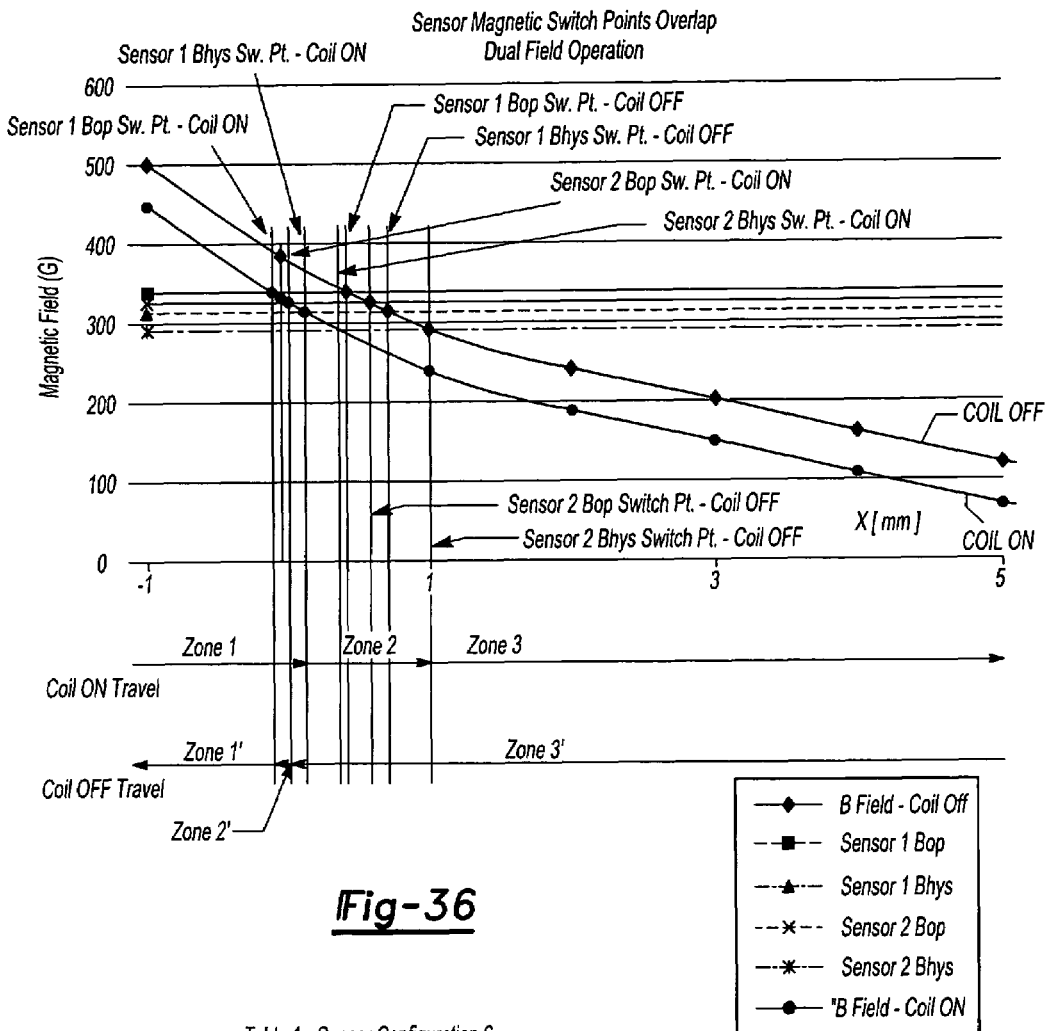
FIG. 36 is a graph showing magnetic field density versus distance for a circuit constructed according to Sensor Configuration 6 operating in dual magnetic fields where the operational magnetic field density ranges of the Hall effect sensors overlap.
FIG. 37 is a table depicting the output of the circuit according to Sensor Configuration 6 operating under the parameters defined by FIG. 36.

FIGS. 32 and 33 depict a method of adjusting the width of certain detection zones by modifying the operating switch point of one sensor relative to the other. The embodiments previously described included a first sensor having an operating range of magnetic field density defined by its operating point and its hysteresis switch point. The operating range of sensor 1 is spaced apart from the operating range of magnetic field density of sensor 2 because sensor 2 is purposefully configured with different operating and hysteresis switch points. In the embodiment depicted in FIG. 32, Sensor Configuration 6 is shown to include the operating switch point of sensor 2 being programmed to lie within the operating range of magnetic field density defined by sensor 1. Specifically, sensor 2 has an operating point (Bop) that is greater than the hysteresis switch point (Bhys) of sensor 1 but lower than the operating switch point (Bop) of sensor 1. By setting the operating switch points of the two Hall effect sensors relatively closely together, the axial travel defined by zone 2 is greatly reduced. As depicted in FIGS. 32 and 33, the distance traveled to exit zone 1, pass entirely through zone 2 and enter zone 3 is approximately 0.5 mm. Accordingly, the dual Hall sensor arrangement having overlapping operating ranges may be useful for an application where relatively small axial distances are traveled by the axially moveable member.

FIGS. 34-37 illustrate that any one of the Sensor Configurations 1-6 may also be used in a dual field operation mode. These Figures also illustrate that the operating ranges of the Hall sensors may be overlapped or not overlapped in the dual field mode of operation as well as the single field mode of operation. The dual field operation mode was described in greater detail previously in reference to the lockable differential having an electromagnet with a coil operable to generate an electromagnetic field.

Figure 38:
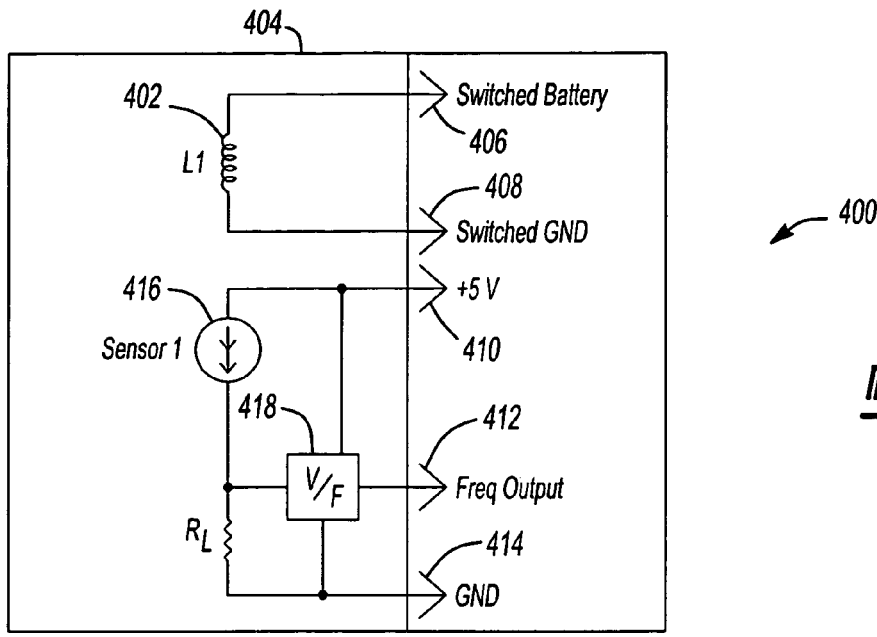
FIG. 38 is a diagram depicting an alternate embodiment circuit for providing a frequency output dependent on the state of the sensors.

FIG. 38 depicts an alternate embodiment circuit 400 for use with an axle assembly including a solenoid assembly similar to the actuators previously defined with reference to differential assembly 26, differential assembly 160 and power transmission device 306. Circuit 400 is operable to transmit axle sensor data indicative of the axial position of a moveable member within the axle assembly. As previously discussed, one or two sensors may be utilized to accomplish this task. Furthermore, the arrangement of the sensors may be configured to produce signals indicating that the axially moveable member is in two or more different zones of axial position.

Circuit 400 is configured to output a frequency signal that may be discrete or proportional to the applied magnetic field. Because automotive application environments often include exposure to electromagnetic fields, it may be desirable to provide a method for transmitting sensor data that is insensitive to these environmental changes. For example, if current amplitude is the output of the sensor arrangement, exposure to certain changes in electromagnetic field may induce erroneous signals from the current sensing circuit. On the other hand, the frequency output of the present embodiment is not affected by exposure to such noise.

FIG. 38 depicts a coil of wire 402 being positioned within an axle housing 404, a first electrical connector or terminal 406 electrically couples one end of coil 402 to the positive terminal of a power source. A second electrical terminal 408 electrically connects the other end of coil 402 with ground. A third terminal 410 protrudes through housing 404 to provide a connection to a 5 volt DC power source. A fourth electrical terminal 412 provides a frequency output signal. A fifth electrical connector or terminal 414 extends through housing 404 and is electrically coupled to ground.

Circuit 400 includes a sensor 416, a load resistor RL and a voltage-to-frequency converter 418. The voltage-to-frequency converter is configured to output a frequency proportional to the Hall sensor states. Hall effect sensor 416 outputs a first level of current when operating in State 1. State 1 is defined as the sensor being positioned within a magnetic field density above Bop. Sensor 416 outputs a second current level when operating in State 2. State 2 is defined as the sensor being positioned within a magnetic field density which is below (Bop–Bhys). If the sensor outputs a current other than the currents previously defined as being equivalent to State 1 or State 2, this is viewed as a fault which may be equated to a circuit short to battery or a short to ground or another electrical connection failure.

Load resistor RL transforms the current output of sensor 1 to a proportional voltage representative of each sensor state. The voltage-to-frequency converter 418 is electrically coupled to sensor 416 and load resistor RL to output a frequency proportional to the Hall sensor states. Accordingly, the circuit 400 depicted in FIG. 38 outputs a frequency indicative of the state of sensor 1. One skilled in the art will appreciate that sensor 1, shown in FIGS. 38-40, may be replaced by any of the circuits previously described having two sensors if detection of multiple states is desired.

Figure 39:
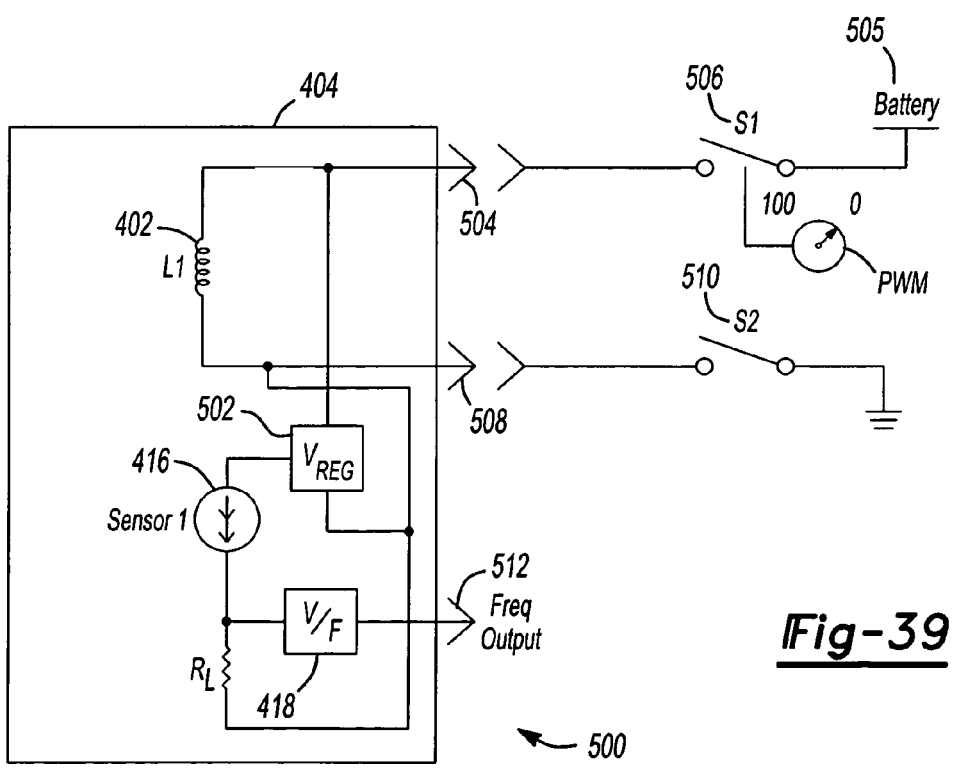
FIG. 39 is a diagram depicting another alternate embodiment circuit having a three wire connection providing a frequency output.

FIG. 39 depicts another alternate embodiment circuit 500 configured to provide a frequency output. Circuit 500 requires only three electrical connections to pass through the wall of housing 404. Coil 402, sensor 416, load resistor RL and voltage-to-frequency converter 418 are electrically connected with a voltage regulator 502 positioned within axle housing 404. A first electrical terminal 504 is electrically connected to one end of coil 402 and a switched positive terminal of a power source 505. A switch 506 is operable to interrupt the supply of current to electrical connector 504 and may be controlled via pulse width modulation. A second electrical connector 508 extends through housing 404. Electrical connector 508 is electrically connected to the other end of coil 402 and a switched ground. Switch 510 is selectively closed to connect electrical connector 508 with ground. A third electrical connector 512 is coupled to voltage-to-frequency converter 418. A frequency output is provided at electrical connector 512. Circuit 500 is configured to power the sensor and frequency output portion using the power source 505 provided to coil 402.

To operate the sensor portion of the circuit without translating the moveable member, switch 510 is closed and switch 506 is operated via pulse width modulation to a desired percentage. This desired percentage of full battery voltage is below a threshold that would cause the solenoid, of which coil 402 forms a part, to move the moveable member. However, the set percentage power is great enough to supply power to the sensor and voltage regulator circuit.

To operate the sensor while coil 402 is sufficiently energized to move the axially moveable member, full battery voltage is supplied through a closed switch 506 and switch 510 is closed to provide the path to ground. Voltage regulator 502 functions to rectify and limit the voltage entering the sensor and voltage-to-frequency converter portion of the circuit. A control module (not shown) may be used to operate switch 506 and switch 510 to provide the proper current levels to operate the sensor circuit with or without the coil 402 being fully energized.

Figure 40:
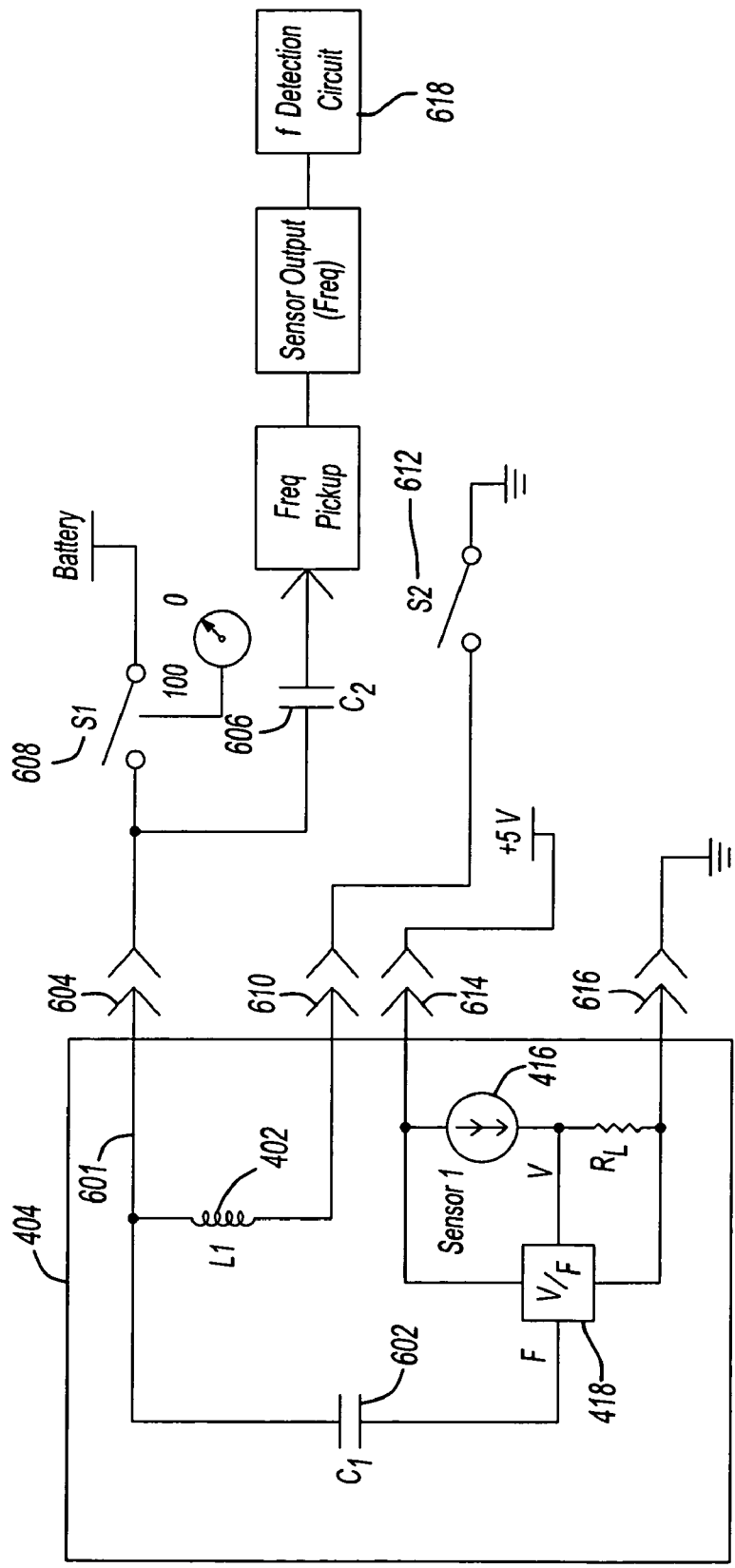
FIG. 40 is a diagram depicting another alternate embodiment circuit having a four wire connection where the frequency output is transmitted along one of the coil power supply lines.

FIG. 40 depicts a circuit 600 configured as a four connection design to send sensor frequency information along an actuator control line 601. Coil 402, sensor 416, load resistor RL and voltage-to-frequency converter 418 are electrically coupled to a capacitor 602. Each of these components are positioned within housing 404. A first electrical connector or terminal 604 extends through housing 404 and electrically connects a first end of coil 402 and a first side of capacitor 602 with a selectively switched power source and a first side of capacitor 606. A switch 608 is controllable via pulse width modulation to selectively provide battery voltage at a modulated frequency on direct current actuator control line 601. A second electrical terminal 610 is coupled to the other side of coil 402 and a selectively switched ground. Switch 612 is operable to selectively couple coil 402 to ground. A third electrical terminal 614 extends through housing 404 and is electrically coupled to sensor 416, voltage-to-frequency converter 418 and a positive 5 volt DC power source positioned outside of housing 404. A fourth electrical terminal 616 couples the load resistor RL and the voltage-to-frequency converter 418 to ground. Capacitors 602 and 606 isolate the direct current to the actuator control line 601 at electrical terminal 604 but allow the alternating current frequency to pass. A frequency detector circuit 618 is placed in communication with the actuator control line 601 to determine the frequency output from the Hall sensor.

Each of the circuits shown and described in FIGS. 38-40 are operable to output frequencies indicative of the axial position of a moveable member within an axle assembly. For example, in a single sensor circuit, if the frequency output is within a first range, a locked differential may be indicated. A frequency output within a second range of frequencies spaced apart from the first range of frequencies indicates that the differential may be in an unlocked state. A frequency output outside of the first range or the second range of frequencies indicates an error and provides a diagnostic indicator of the circuit.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly comprising:
   a housing;
   a first shaft rotatably positioned in the housing;
   a second shaft rotatably positioned in the housing;
   a power transfer mechanism positioned in the housing, the power transfer mechanism selectively transmitting rotary power between the first shaft and the second shaft, the power transfer mechanism having a linearly moveable member, the position of the linearly moveable member being indicative of an operating state of the power transfer mechanism;
   a permanent magnet mounted to one of the moveable member and the housing and a Hall effect sensor being mounted to the other of the moveable member and the housing, wherein the sensor is exposed to a changing magnetic field density as the magnet and sensor move relative to one another;
   an actuator being operable to move the linearly moveable member to cause or interrupt power transmission between the first shaft and the second shaft; and
   a sensor circuit positioned within the housing and operable to output a signal having a frequency that varies in accordance with the position of the linearly moveable member.

2. The axle assembly of claim 1 wherein the sensor circuit includes the Hall effect sensor in series with a load resistor.

3. The axle assembly of claim 2 wherein the sensor circuit includes a voltage-to-frequency converter.

4. The axle assembly of claim 1 wherein the power transfer mechanism is a differential.

5. The axle assembly of claim 1 wherein the power transfer mechanism is a clutch.

6. The axle assembly of claim 1 wherein the sensor circuit is operable to output a signal indicating if the moveable member is located within one of two ranges of axial position.

7. An axle assembly comprising:
   a housing;
   a first shaft rotatably positioned in the housing;
   a second shaft rotatably positioned in the housing;
   a power transfer mechanism positioned in the housing, the power transfer mechanism selectively transmitting rotary power between the first shaft and the second shaft, the power transfer mechanism having a linearly moveable member, the position of the linearly moveable member being indicative of an operating state of the power transfer mechanism;
   an actuator being operable to move the linearly moveable member to cause or interrupt power transmission between the first shaft and the second shaft;
   a sensor circuit positioned within the housing and operable to output a signal having a frequency that varies in accordance with the position of the linearly moveable member; and
   an electromagnet operable to translate the moveable member, wherein the electromagnet includes a coil in electrical communication with the sensor circuit.

8. The axle assembly of claim 7 wherein the signal indicative of the position of the moveable member is provided on a line coupling the coil to a power source.

9. The axle assembly of claim 8 wherein the sensor circuit is operable to isolate a direct current component and allow an alternating current component to pass as the signal indicative of the position of the moveable member.

10. An axle assembly comprising:
a housing;
a first shaft rotatably positioned in the housing;
a second shaft rotatably positioned in the housing;
a power transfer mechanism positioned in the housing, the power transfer mechanism selectively transmitting rotary power between the first shaft and the second shaft, the power transfer mechanism having a linearly moveable member, the position of the linearly moveable member being indicative of an operating state of the power transfer mechanism;
an actuator being operable to move the linearly moveable member to cause or interrupt power transmission between the first shaft and the second shaft; and
a sensor circuit positioned within the housing and operable to output a signal having a freguency that varies in accordance with the position of the linearly moveable member, wherein the sensor circuit is operable to output a signal indicating if the moveable member is located within one of three ranges of axial position.

11. An axle assembly comprising:
a housing;
a case rotatably positioned within said housing, said case defining an interior cavity;
a pair of pinion gears rotatably supported in said interior cavity;
a pair of side gears rotatably supported in said interior cavity, wherein each of said pinion gears drivingly engages each of said side gears;
a power transfer mechanism including an axially moveable member operable to drivingly connect one of said side gears with said case; and
a sensor coupled to one of said housing, said case and said axially moveable member, said sensor being electrically connected to a circuit operable to encode the position of said axially moveable member as a frequency signal, wherein said circuit is configured to output three different frequencies, each frequency being indicative of the axially moveable member being located within one of three ranges of axial position.

12. The axle assembly of claim 11 further including a magnet positioned within the housing, said sensor being a Hall effect sensor where said magnet and said sensor are axially moveable relative to one another.

13. An axle assembly comprising:
a housing;
a first rotatable member positioned within the housing;
a second rotatable member positioned within the housing;
a power transfer mechanism operable to selectively transmit power between the first and second rotatable members, the power transfer mechanism having a moveable member, the position of the moveable member being indicative of an operating state of the power transfer mechanism;
an actuator being operable to move the moveable member to selectively cause power transmission between the first and second rotatable members; and
a sensor circuit having a control line providing a control signal to the actuator and a sensor providing an output signal having a frequency that varies in accordance with the position of the moveable member, wherein the output signal is provided on the actuator control line.

14. The axle assembly of claim 13 further including a frequency detection circuit connected to the actuator control line for detecting frequency of the output signal.

15. The axle assembly of claim 13 wherein the actuator includes an electromagnet operating on an individual circuit separate from the sensor circuit.

16. An axle assembly comprising:
a housing;
a first rotatable member positioned within the housing:
a second rotatable member positioned within the housing:
a power transfer mechanism operable to selectively transmit power between the first and second rotatable members, the power transfer mechanism having a moveable member, the nosition of the moveable member being indicative of an operating state of the power transfer mechanism;
an actuator being operable to move the moveable member to selectively cause power transmission between the first and second rotatable members; and
a sensor circuit having a control line providing a control signal to the actuator and a sensor providing an output signal having a frequency that varies in accordance with the position of the moveable member, wherein the actuator includes an electromagnet, the electromagnet and the sensor circuit sharing a common source of power.

17. The axle assembly of claim 16 wherein the sensor circuit includes a voltage regulator coupled to a power source.

18. The axle assembly of claim 17 wherein the power source is a battery selectively connected to the actuator control line via pulse width modulation.

19. The axle assembly of claim 18 wherein the sensor circuit is operable to provide a frequency output indicative of the position of the linearly moveable member by providing a pulse width modulated source of power below a threshold sufficient to cause the electromagnet to move the moveable member.

\* \* \* \* \*